United States Patent
Ono et al.

(10) Patent No.: US 11,384,247 B2
(45) Date of Patent: Jul. 12, 2022

(54) THERMOCHROMIC COLOR-MEMORY COMPOSITION AND THERMOCHROMIC COLOR-MEMORY MICROCAPSULE PIGMENT ENCAPSULATING THE SAME

(71) Applicant: THE PILOT INK CO., LTD., Aichi-ken (JP)

(72) Inventors: Yoshiaki Ono, Aichi-ken (JP); Masayuki Mita, Aichi-ken (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 197 days.

(21) Appl. No.: 16/489,098

(22) PCT Filed: Feb. 22, 2018

(86) PCT No.: PCT/JP2018/006553
§ 371 (c)(1),
(2) Date: Aug. 27, 2019

(87) PCT Pub. No.: WO2018/155583
PCT Pub. Date: Aug. 30, 2018

(65) Prior Publication Data
US 2020/0071532 A1 Mar. 5, 2020

(30) Foreign Application Priority Data

Feb. 27, 2017 (JP) .............................. JP2017-034535
Jun. 21, 2017 (JP) .............................. JP2017-121626

(51) Int. Cl.
*C09B 67/00* (2006.01)
*B41M 5/30* (2006.01)
(Continued)

(52) U.S. Cl.
CPC ......... *C09B 67/0097* (2013.01); *B41M 5/305* (2013.01); *B43K 7/005* (2013.01);
(Continued)

(58) Field of Classification Search
CPC .... C09B 67/0097; B41M 5/305; B43K 7/005; C09D 11/17; C09D 11/50; C09K 9/02
(Continued)

(56) References Cited

U.S. PATENT DOCUMENTS

| 3,957,849 A | 5/1976 | Henrick et al. |
| 2012/0049139 A1* | 3/2012 | Ono .......................... C09K 9/02 252/583 |

(Continued)

FOREIGN PATENT DOCUMENTS

| CN | 107200865 | 9/2017 |
| JP | 61-284481 | 12/1986 |

(Continued)

OTHER PUBLICATIONS

International Preliminary Report on Patentability dated Sep. 6, 2019 in International Application No. PCT/JP2018/006553.
(Continued)

*Primary Examiner* — Ling Siu Choi
*Assistant Examiner* — Ronald Grinsted
(74) *Attorney, Agent, or Firm* — Wenderoth, Lind & Ponack, L.L.P.

(57) ABSTRACT

The present invention provides a thermochromic color-memory composition including (a) an electron-donating color-developing organic compound, (b) an electron-accepting compound, and (c) an ester compound represented by the following formula (1) or (2), as a reaction medium which controls color reaction of the component (a) and the component (b); and a thermochromic color-memory microcapsule pigment encapsulating the thermochromic color-memory composition.

(Continued)

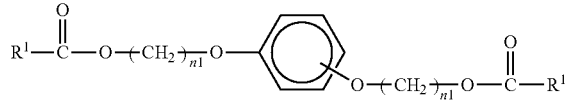

(1)

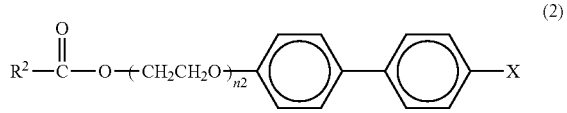

(2)

12 Claims, 1 Drawing Sheet

(51) Int. Cl.
 *B43K 7/00* (2006.01)
 *C09D 11/17* (2014.01)
 *C09D 11/50* (2014.01)
 *C09K 9/02* (2006.01)
 *C09B 67/02* (2006.01)
(52) U.S. Cl.
 CPC .............. *C09D 11/17* (2013.01); *C09D 11/50* (2013.01); *C09K 9/02* (2013.01)
(58) Field of Classification Search
 USPC ........................................................ 252/582
 See application file for complete search history.

(56) References Cited

U.S. PATENT DOCUMENTS

| | | |
|---|---|---|
| 2016/0130455 A1 | 5/2016 | Ono |
| 2017/0050460 A1 | 2/2017 | Ono |

FOREIGN PATENT DOCUMENTS

| | | |
|---|---|---|
| JP | 2005-1369 | 1/2005 |
| JP | 2006-137886 | 6/2006 |
| JP | 2006-188660 | 7/2006 |
| JP | 2008-280523 | 11/2008 |
| JP | 2010-56478 | 3/2010 |
| JP | 2012-188648 | 10/2012 |
| WO | 2010/131684 | 11/2010 |
| WO | 2012/046837 | 4/2012 |
| WO | 2014/200053 | 12/2014 |
| WO | 2015/119161 | 8/2015 |
| WO | 2016/027664 | 2/2016 |

OTHER PUBLICATIONS

Extended European Search Report dated Aug. 25, 2020 in corresponding European Patent Application No. 18757822.4.
International Search Report dated Mar. 20, 2018 in International Application No. PCT/JP2018/006553.

* cited by examiner

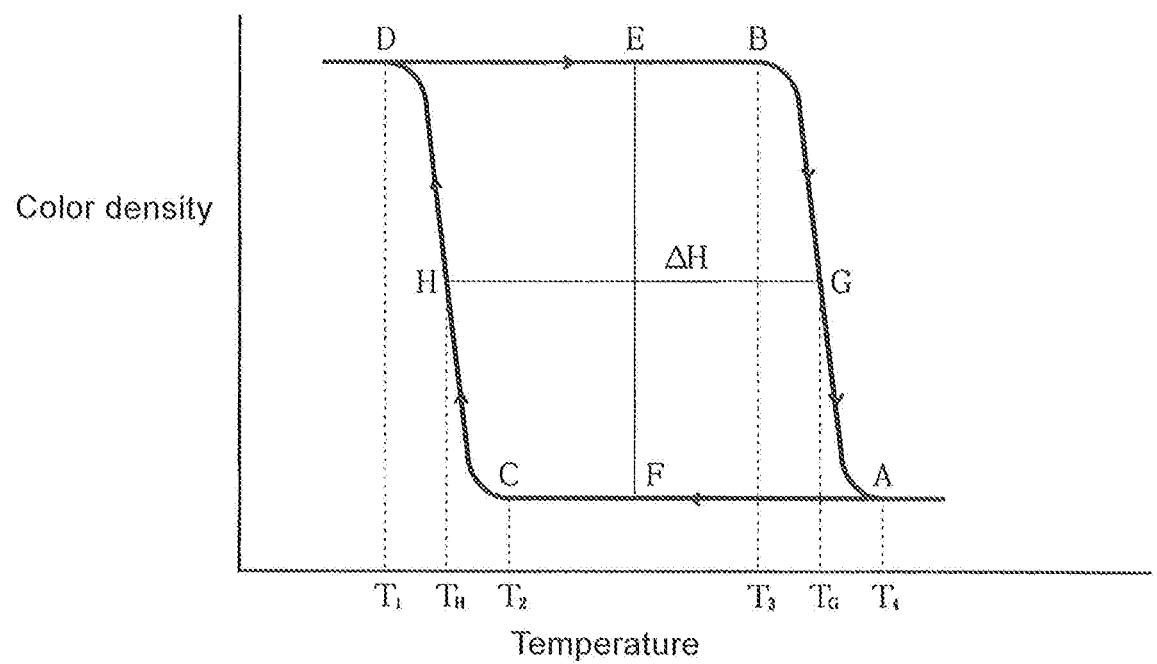

THERMOCHROMIC COLOR-MEMORY COMPOSITION AND THERMOCHROMIC COLOR-MEMORY MICROCAPSULE PIGMENT ENCAPSULATING THE SAME

TECHNICAL FIELD

The present invention relates to a thermochromic color-memory composition and a thermochromic color-memory microcapsule pigment encapsulating the thermochromic color-memory composition. More specifically, the present invention relates to a thermochromic color-memory composition which displays reversible discoloration between coloring and decoloring with showing a large hysteresis characteristic upon changing temperature and keeps either of the colored state and decolored state alternately and reversibly even after removal of application of the heat or cold required for the discoloration, and to a thermochromic color-memory microcapsule pigment encapsulating the thermochromic color-memory composition.

BACKGROUND ART

The present applicant has already proposed such a type of thermochromic color-memory material (see, for example, Patent Literatures 1 to 9).

Conventional reversible thermal discoloration materials discolor with a discoloration temperature as a border. In the material, only one specified state of both states before and after discoloration exists within a normal temperature range, and the other state is maintained while a heat or cold necessary for expressing the state is applied but returns to the state of normal temperature range when application of the heat or cold is removed. In comparison with such a type, the thermochromic color-memory material can selectively maintain, within a normal temperature range, either of the color on the lower temperature side than the discoloration temperature and the color on the higher temperature side than that and can alternately maintain the color by applying a heat or cold as needed. The material is therefore applied in various fields such as temperature-sensitive recording materials, toys, ornaments, and printing.

CITATION LIST

Patent Literature

Patent Literature 1: JP 2005-1369 A
Patent Literature 2: JP 2006-137886 A
Patent Literature 3: JP 2006-188660 A
Patent Literature 4: JP 2008-280523 A
Patent Literature 5: WO 2010/131684 A
Patent Literature 6: WO 2012/046837 A
Patent Literature 7: WO 2014/200053 A
Patent Literature 8: WO 2015/119161 A
Patent Literature 9: WO 2016/027664 A

SUMMARY OF INVENTION

Technical Problem

The color-memory effect of this kind is expressed only in a system where specific compounds, among compounds selected from esters, ketones, ethers, and the like that control color reaction, are used as constituents. The present invention further searches for compounds serving as a reaction medium which allows the color-memory effect to be expressed, and an object of the present invention is to enhance freedom degree of selection of the reaction medium and thereby further promote the use of such a kind of thermochromic color memory material.

Solution to Problem

The present inventors have found that a system applying, as a reaction medium for color reaction, a compound having a specific structure shows a thermal discoloration characteristic with a large hysteresis width ($\Delta H$) and produces an effective color-memory effect. Thus, they have completed the present invention.

The present invention relates to a thermochromic color-memory composition including:

(a) an electron-donating color-developing organic compound;

(b) an electron-accepting compound; and (c) an ester compound represented by the following formula (1), as a reaction medium which controls color reaction of the component (a) and the component (b):

[Chem. 1]

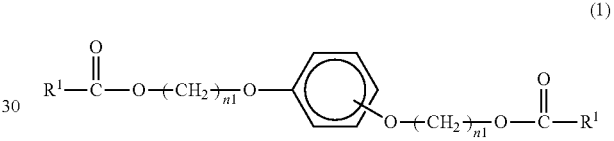

(wherein each $R^1$ independently represents a cycloalkyl group having 3 to 8 carbon atoms or a cycloalkylalkyl group having 4 to 9 carbon atoms, and each n1 independently represents an integer of 1 to 3).

Further, the present invention relates to a thermochromic color-memory composition including:

(a) an electron-donating color-developing organic compound;

(b) an electron-accepting compound; and (c) an ester compound represented by the following formula (2), as a reaction medium which controls color reaction of the component (a) and the component (b):

[Chem. 2]

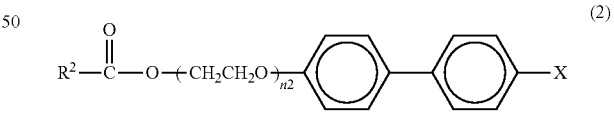

(wherein $R^2$ represents an alkyl group having 3 to 17 carbon atoms, a cycloalkyl group having 3 to 8 carbon atoms, or a cycloalkylalkyl group having 5 to 8 carbon atoms, X represents a hydrogen atom, an alkyl group having 1 to 5 carbon atoms, a methoxy group, an ethoxy group, or a halogen atom, and n2 represents an integer of 1 to 3.)

The present invention relates to a thermochromic color-memory microcapsule pigment encapsulating the thermochromic color-memory composition.

Further, the present invention relates to an ink composition including the thermochromic color-memory microcapsule pigment, and a vehicle.

Advantageous Effects of Invention

The thermochromic color-memory composition according to the present invention induces reversible discoloration between coloring and decoloring and shows a large hysteresis width ($\Delta H$) upon this reversible discoloration in terms of color density-temperature curve. In addition, the composition is capable of interchangeably memorizing and retaining both colors at the temperature sides higher than and lower than the discoloration temperature, and capable of effectively expressing a property of reproducing, memorizing, and retaining either of these colors in a reversible manner by heating or cooling the composition as required. Accordingly, the present invention provides a thermochromic color-memory composition applicable to various fields of temperature indication, ornaments, toys, training and learning elements, and the like, as well as a thermochromic color-memory microcapsule pigment encapsulating the composition.

BRIEF DESCRIPTION OF DRAWINGS

FIG. 1 is a graph for explaining a hysteresis characteristic of the thermochromic color-memory composition of the present invention in a color density-temperature curve.

DESCRIPTION OF EMBODIMENTS

The hysteresis characteristics of the thermochromic color-memory composition of the present invention and the thermochromic color-memory microcapsule pigment using the same (a reversibly thermochromic composition having a color-memory property and a reversibly thermochromic microcapsule pigment having a color-memory property which uses the same) will now be described with reference to the graph showing the color density-temperature curve shown in FIG. 1.

In FIG. 1, the color density is plotted on the ordinate and the temperature is plotted on the abscissa. A change in the color density due to a temperature change occurs along the arrow. Here, A is a point showing the density at a temperature $T_4$ at which a completely decolored state is achieved (hereinafter referred to as "complete decoloring temperature"); B is a point showing the density at a temperature $T_3$ at which a completely colored state can be maintained (hereinafter referred to as "decoloring starting temperature"); C is a point showing the density at a temperature $T_2$ at which a completely decolored state can be maintained (hereinafter referred to as "coloring starting temperature"); and D is a point showing the density at a temperature $T_1$ at which a completely colored state is achieved (hereinafter referred to as "complete coloring temperature").

A discoloration temperature region is a temperature region between $T_1$ and $T_4$, while the temperature region between $T_2$ and $T_3$ is a substantial discoloration temperature region, that is, the temperature region in which either of colored state or decolored state can be maintained.

Specifically, a change of the thermochromic color-memory composition from the decolored state to the colored state can be initiated by cooling the composition to the coloring starting temperature ($T_2$) or lower, A completely colored state can be brought about by cooling the composition to the complete coloring temperature ($T_1$) or lower, and this state can be maintained unless the temperature of the thermochromic color-memory composition is increased to the decoloring starting temperature ($T_3$).

Further, a change of the thermochromic color-memory composition from the colored state to the decolored state can be initiated by heating the composition to the decoloring starting temperature ($T_3$) or higher with application of heat generated by friction or the like. A completely decolored state can be brought about by heating the composition to the complete decoloring temperature ($T_4$) or higher, and this state can be maintained unless the temperature of the thermochromic color-memory composition is decreased to the coloring starting temperature ($T_2$).

The length of a line segment EF is a measure showing contrast of discoloration, and the length of the line segment HG is a temperature width showing the degree of hysteresis (hereinafter referred to as hysteresis width, and indicated as $\Delta H$). The larger $\Delta H$ value facilitates keeping of each state before and after discoloration. The $\Delta H$ value in which the respective states before and after discoloration can be maintained is 8° C. or greater, specifically within a range of 8° C. to 80° C. Here, $\Delta t$, which is a difference between $T_4$ and $T_3$ or a difference between $T_2$ and $T_1$, is a measure for showing sensibility of the discoloration, and a practicable range thereof is preferably from 1° C. to 20° C., more preferably 1° C. to 15° C., and still more preferably 1° C. to 10° C.

In order to allow only one specific state, of the states before and after discoloration, to exist in a normal temperature range, the complete deceleration temperature ($T_4$) is preferably 50° C. or higher, more preferably 55° C. or higher, and still more preferably 60° C. or higher; and the coloring starting temperature ($T_2$) is preferably 0° C. or lower, more preferably –5° C. or lower; and still more preferably –10° C. or lower.

Specific compounds to be used as the respective components (a), (b), and (c) will be exemplified below.

The component (a) of the present invention, namely, an electron-donating color-developing organic compound, is a color-determining component which develops a color by donating an electron(s) to the component (b), which is a color developer.

Examples of the electron-donating color-developing organic compound include phthalide compounds, fluoran compounds, styrylquinoline compounds, diazarhodamine lactone compounds, pyridine compounds, quinazoline compounds, and bisquinazoline compounds, among which phthalide compounds and fluoran compounds are preferred. Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds, among which phenylindolyl azaphthalide compounds and their derivatives are preferred. Examples of the fluoran compounds include aminofluoran compounds, alkoxyfluoran compounds, and derivatives of these compounds.

Specific examples of these compounds include
3,3-bis(p-dimethylaminophenyl)-6-dimethylaminophthalide,
3-(4-diethylaminophenyl)-3-(1-ethyl-2-methylindol-3-yl)phthalide,
3,3-bis(1-n-butyl-2-methylindol-3-yl)phthalide,
3,3-bis(2-ethoxy-4-diethylaminophenyl)-4-azaphthalide,
3-(2-ethoxy-4-diethylaminophenyl)-3-(1-ethyl-2-methylindol-3-yl)-4-azaphthalide,
3-(2-hexyloxy-4-diethylaminophenyl)-3-(1-ethyl-2-methylindol-3-yl)-4-azaphthalide,
3-[2-ethoxy-4-(N-ethylanilino)phenyl]-3-(1-ethyl-2-methylindol-3-yl)-4-azaphthalide, 3-(2-acetamido-4-diethylaminophenyl)-3-(1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclonexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-diethylaminofluoran,
2-(3-trifluoromethylanilino)-6-dipentylaminofluoran,
2-(dibenzylamino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-anilino-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xylidino-3-methyl-6-diethylaminofluoran,
2-anilino-3-methyl-6-(N-ethyl-N-p-tolylamino)fluoran,
1,2-benz-6-diethylaminofluoran,
1,2-benz-6-(N-ethyl-N-isobutylamino)fluoran,
1,2-benz-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H)isobenzofuran]-3'-one,2-(diethylamino)-8-(diethylamino)-4-methyl,
spiro[5H-(1)benzopyrano(2,3-d)pyrimidine-5,1'(3'H)isobenzofuran]-3'-one,2-(di-n-butylamino)-8-(di-n-butylamino)-4-methyl
spiro[5H-(1)benzopyrano(2,3-d)pyrimidine-5,1'(3'H)isobenzofuran]-3'-one,2-(di-n-butylamino)-8-(diethylamino)-4-methyl
spiro[5H-(1)benzopyrano(2,3-d)pyrimidine-5,1'(3'H)isobenzofuran]-3'-one,2-(di-n-butylamino)-8-(N-ethyl-N-1-amylamino)-4-methyl
spiro[5H-(1)benzopyrano(2,3-d)pyrimidine-5,1'(3'H)isobenzofuran]-3'-one,2-(dibutylamino)-8-(dipentylamino)-4-methyl
4,5,6,7-tetrachloro-3-[4-(dimethylamino)-2-methoxyphenyl]-3-(1-butyl-2-methyl-1H-indol-3-yl)-1(3H)-isobenzofuranone
4,5,6,7-tetrachloro-3-[4-(diethylamino)-2-ethylphenyl]-3-(1-ethyl-2-methyl-1H-indol-3-yl)-1(3H)-isobenzofuranone
4,5,6,7-tetrachloro-3-[4-(diethylamino)-2-ethoxyphenyl]-3-(1-pentyl-2-methyl-1H-indol-3-yl)-1(3H)-isobenzofuranone
4,5,6,7-tetrachloro-3-[4-(diethylamino)-2-methylphenyl]-3-(1-ethyl-2-methyl-1H-indol-3-yl)-1(3H)-isobenzofuranone
3',6'-bis[phenyl(2-methylphenyl)amino]-spiro[isobenzofuran-1(3H),9'-[9H]xanthene]-3-one,
3',6'-bis[phenyl(3-methylphenyl)amino]-spiro[isobenzofuran-1(3H),9'-[9H]xanthene]-3-one,
3',6'-bis[phenyl(3-ethylphenyl)amino]-spiro[isobenzofuran-1(3H),9'-[9H]xanthene]-3-one,
2,6-bis(2'-ethyloxyphenyl)-4-(4'-dimethylaminophenyl)pyridine,
2,6-bis(2',4)-diethyloxyphenyl)-4-(4'-dimethylaminophenyl)pyridine,
2-(4'-dimethylaminophenyl)-4-methoxy-quinazoline, and
4,4'-(ethylenedioxy)-bis[2-(4-diethylaminophenyl)quinazoline].

The fluoran compounds may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chloro group).

The component (b) of the present invention, namely an electron-accepting compound, is a compound which receives an electron(s) from the component (a) and functions as a color developer of the component (a).

Examples of the electron-accepting compound include active proton-containing compounds and derivatives thereof; pseudo-acidic compounds (compounds which are not acids but each act as an acid in a composition to cause the component (a) to develop a color); and compounds with electron vacancies. Among these, the component (b) is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; as well as azole-based compounds and derivatives thereof, and 1,2,3-triazole and derivatives thereof. Among these, phenolic hydroxyl group-containing compounds are preferred since they can allow an effective discoloration characteristic to be expressed.

The phenolic hydroxyl group-containing compounds include a wide range of compounds, ranging from monophenol compounds to polyphenol compounds, and bis-type and tris-type phenols, phenol-aldehyde condensation resins and the like are also included therein. Among the phenolic hydroxyl group-containing compounds, those which contain at least two benzene rings or have a bis-hydroxyphenyl sulfide structure are preferred. Further, these compounds may also have a substituent, examples of which include an alkyl group, an aryl group, an acyl group, an alkoxycarbonyl group, a carboxy group and an ester thereof, as well as an amide group and a halogen group. Examples of the phenolic hydroxyl group-containing compounds include monophenols and polyphenols; these phenols further including as a substituent an alkyl group, an aryl group, an acyl group, an alkoxycarbonyl group, a carboxy group or an ester or an amide group thereof, a halogen group or the like; and phenol-aldehyde condensation resins such as bis-type phenols and tris-type phenols. Alternatively, the phenolic hydroxyl group-containing compounds may be metal salts of phenolic hydroxyl group-containing compounds.

Examples of the metal contained in the metal salts of the active proton-containing compounds include sodium, potassium, calcium, zinc, zirconium, aluminum, magnesium, nickel, cobalt, tin, copper, iron, vanadium, titanium, lead, and molybdenum.

Specific examples of the phenolic hydroxyl group-containing compounds include phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 4,4-dihydroxydiphenylsulfone, bis(4-hydroxyphenyl)sulfide, 1,1-bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis (4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane, 1,1-bis(4-hydroxyphenyl)-3-methylpentane, 1,1-bis(4-hydroxyphenyl)-2,3-dimethylpentane, 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl)propane, 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 2,2-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane, 9,9-bis(4-hydroxy-3-methylphenyl)fluorene, 1,1-bis[2-(4-hydroxyphenyl)-2-propyl]benzene, bis(2-hydroxyphenyl)methane, 1,1,1-tris(4-hydroxyphenyl)ethane, and 3,3-bis(3-methyl-4-hydroxyphenyl)butane.

By using a specific ester compound as the component (c) of the present invention, namely, as a reaction medium which reversibly induces an electron transfer reaction between the component (a) and the component (b) in a specific temperature range, it is possible to obtain thermochromic color-memory compositions having various discoloration temperatures.

The ester compound used in the present invention is a compound represented by formula (1) or (2).

First, the ester compound represented by the formula (1) will be described.

[Chem. 3]

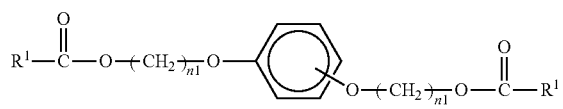

(1)

In the formula (1), each $R^1$ independently represents a cycloalkyl group having 3 to 8 carbon atoms or a cycloalkylalkyl group having 4 to 9 carbon atoms, preferably a cycloalkyl group having 5 to 7 carbon atoms or a cycloalkylalkyl group having 5 to 8 carbon atoms, and more preferably a cyclohexyl group or a cycloalkylalkyl group having 7 or 8 carbon atoms; and each n1 independently represents an integer of 1 to 3, preferably 1 or 2, and more preferably 2.

The ester compound represented by the formula (1) can be obtained by esterification of bis(hydroxyalkoxy)benzene represented by the following formula (1') with various carboxylic acids containing a cycloalkyl group or a cycloalkylalkyl group.

[Chem. 4]

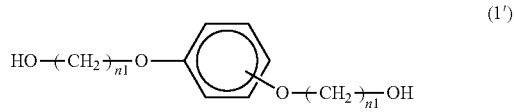

(1')

n1 in the formula is the same as in the formula (1).

Specific examples of bis(hydroxyalkoxy)benzene represented by the formula (1') include 1,4-bis(hydroxymethoxy)benzene, 1,3-bis(hydroxymethoxy)benzene, 1,2-bis(hydroxymethoxy)benzene, 1,4-bis(2-hydroxyethoxy)benzene, 1,3-bis(2-hydroxyethoxy)benzene, 1,2-bis(2-hydroxyethoxy)benzene, 1,4-bis(3-hydroxypropoxy)benzene, 1,3-bis(3-hydroxypropoxy)benzene and 1,2-bis(3-hydroxypropoxy)benzene.

Also, 1,4-bis(hydroxyalkoxy)benzenes and 1,3-bis(hydroxyalkoxy)benzenes are suitably used in terms of availability and cost, and 1,4-bis(2-hydroxyethoxy)benzene and 1,3-bis(2-hydroxyethoxy)benzene are more suitably used.

Among carboxylic acids used in the esterification reaction with bis(hydroxyalkoxy)benzene of the formula (1'), examples of a carboxylic acid containing a cycloalkyl group include cyclopropanecarboxylic acid, cyclobutanecarboxylic acid, cyclopentanecarboxylic acid, cyclohexanecarboxylic acid, cycloheptanecarboxylic acid, and cyclooctanecarboxylic acid. Examples of carboxylic acid containing a cycloalkylalkyl group include cyclopropyl acetic acid, cyclobutyl acetic acid, cyclopentyl acetic acid, cyclopentyl propionic acid, cyclohexyl acetic acid, cyclohexane propionic acid and 4-cyclohexanebutyric acid.

In a thermochromic color-memory composition using, as the component (c), esters containing a cycloalkyl group or a cycloakylalkyl group obtained by a combination of bis(hydroxyalkoxy)benzene and a carboxylic acid, the ΔH value is larger than that in a case where an ester compound whose substituent $R^1$ has a linear alkyl group and which has the same structure except for this point is used as the component (c), and the color-memory property can be maintained in a wider temperature range.

Specific examples of the ester compound represented by the formula (1) are shown below.

[Chem. 5]

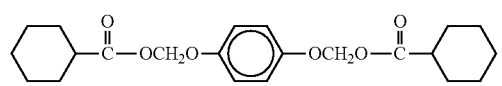

Compound 101

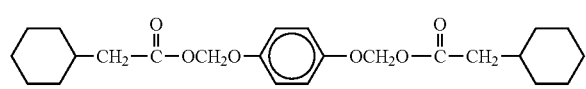

Compound 102

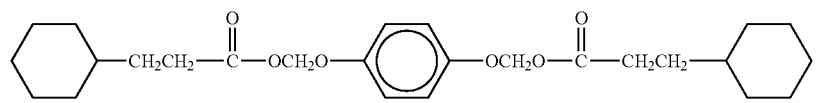
Compound 103
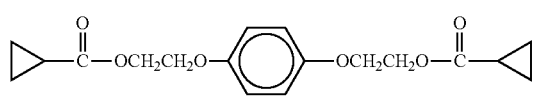
Compound 104
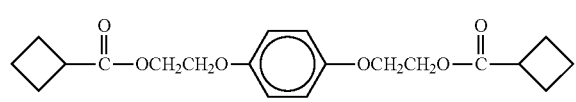
Compound 105
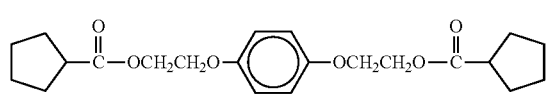
Compound 106
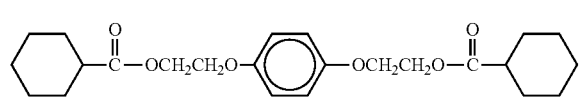
Compound 107
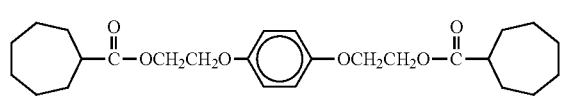
Compound 108
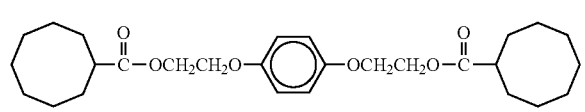
Compound 109
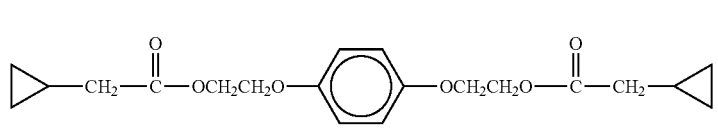
Compound 110
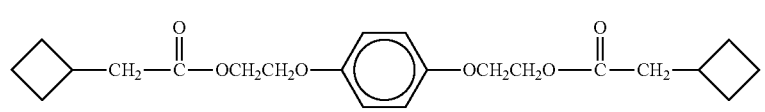
Compound 111
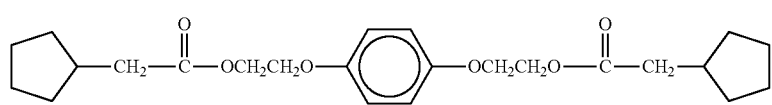
Compound 112
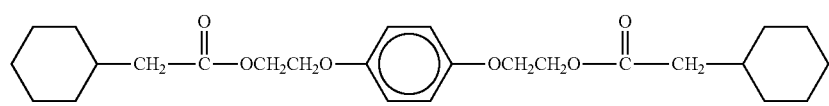
Compound 113
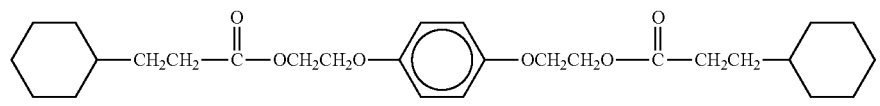
Compound 114
[Chem. 6]
Compound 115
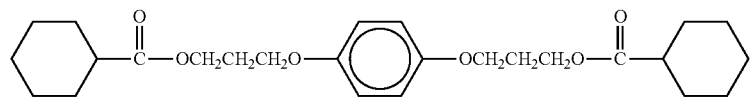
Compound 116

Compound 117
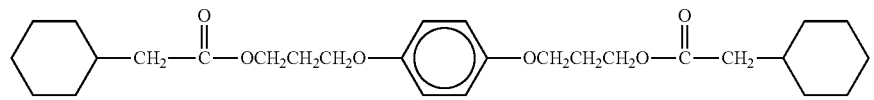
Compound 118
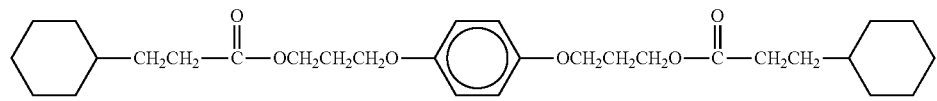
Compound 119
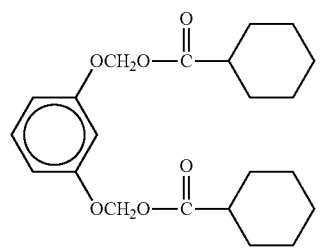
Compound 120
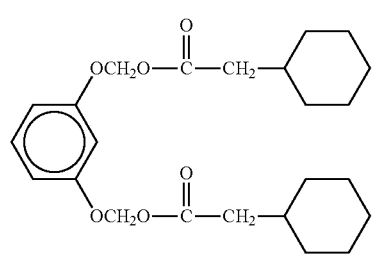
Compound 121
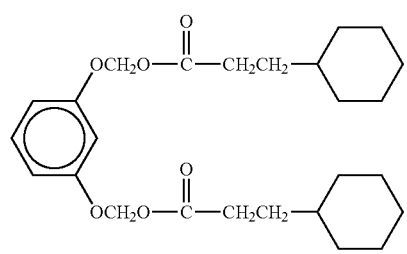
Compound 122
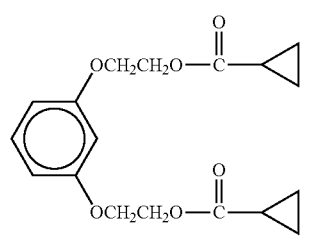
Compound 123
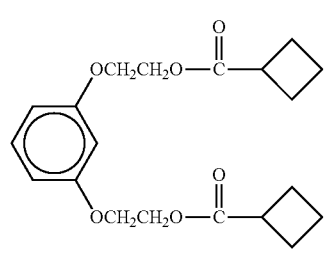

[Chem. 7]
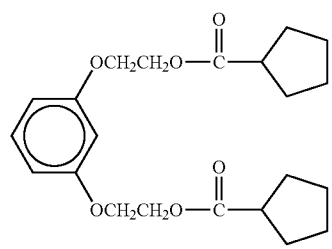
Compound 124
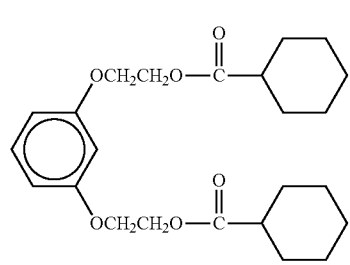
Compound 125
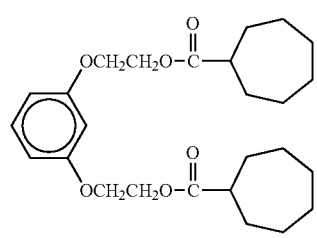
Compound 126
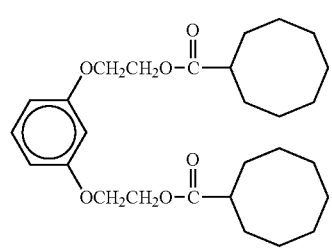
Compound 127
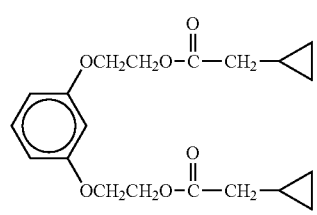
Compound 128
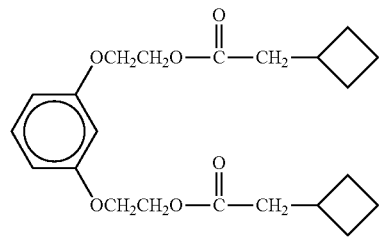
Compound 129

Compound 130
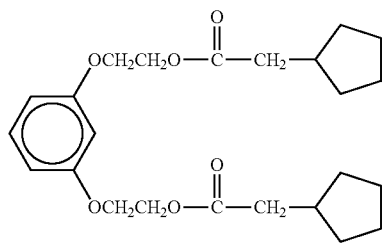
[Chem. 8]
Compound 131
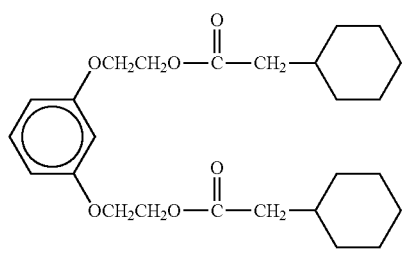
Compound 132
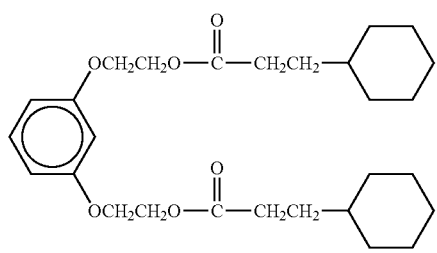
Compound 133
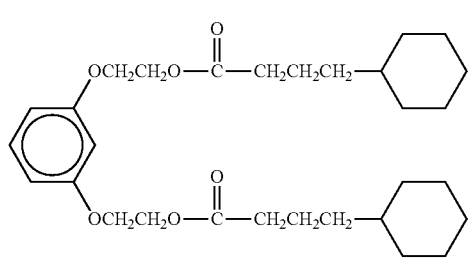
Compound 134
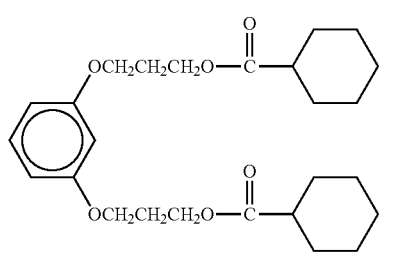
Compound 135
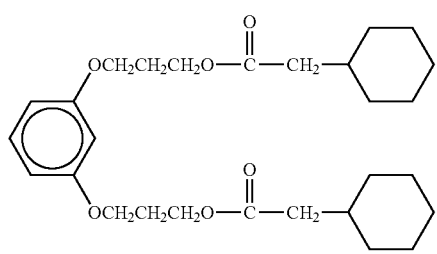

Compound 136

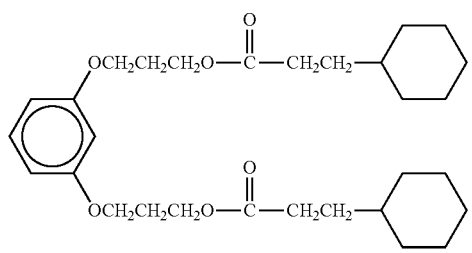

Compound 137

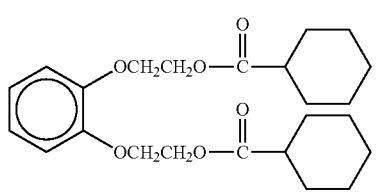

[Chem. 9]

Compound 138

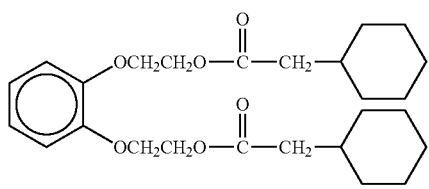

Compound 139

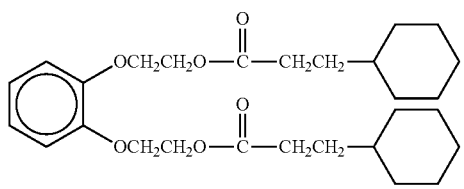

Next, the ester compound represented by the formula (2) will be described.

[Chem. 10]

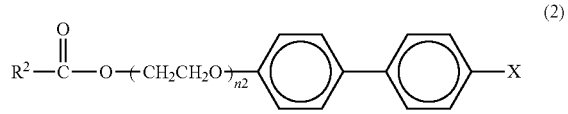

(2)

In the formula (2), $R^2$ represents an alkyl group having 3 to 17 carbon atoms, a cycloalkyl group having 3 to 8 carbon atoms, or a cycloalkylalkyl group having 5 to 8 carbon atoms, preferably a linear alkyl group having 5 to 15 carbon atoms, a cycloalkyl group having 5 to 7 carbon atoms or a cycloalkylalkyl group having 6 to 8 carbon atoms, and more preferably a linear alkyl group having 7 to 13 carbon atoms, a cyclohexyl group, or a cycloalkylalkyl group having 7 or 8 carbon atoms;

X represents a hydrogen atom, an alkyl group having 1 to 5 carbon atoms, a methoxy group, an ethoxy group or a halogen atom, preferably a hydrogen atom, a methyl group, or a methoxy group, and more preferably a hydrogen atom; and n2 is an integer of 1 to 3 and preferably 1 or 3.

The ester compound represented by the formula (2) can be obtained by esterification of glycol ether of 4-phenylphenol derivative represented by the following formula (2') with various carboxylic acids.

[Chem. 11]

(2')

In the formula (2'), X and n2 are the same as in the formula (2), X represents a hydrogen atom, an alkyl group having 1 to 5 carbon atoms, a methoxy group, an ethoxy group or a halogen atom, and n represents an integer of 1 to 3.

When n2 is 1, the ester compound is a 4-phenylphenol ethylene glycol ether derivative, when n2 is 2, the ester compound is a 4-phenylphenol diethylene glycol ether derivative, and when n2 is 3, the ester compound is a 4-phenylphenol triethylene glycol ether derivative.

Specific examples of the ester compound represented by the formula (2) are shown below.

[Chem. 12]
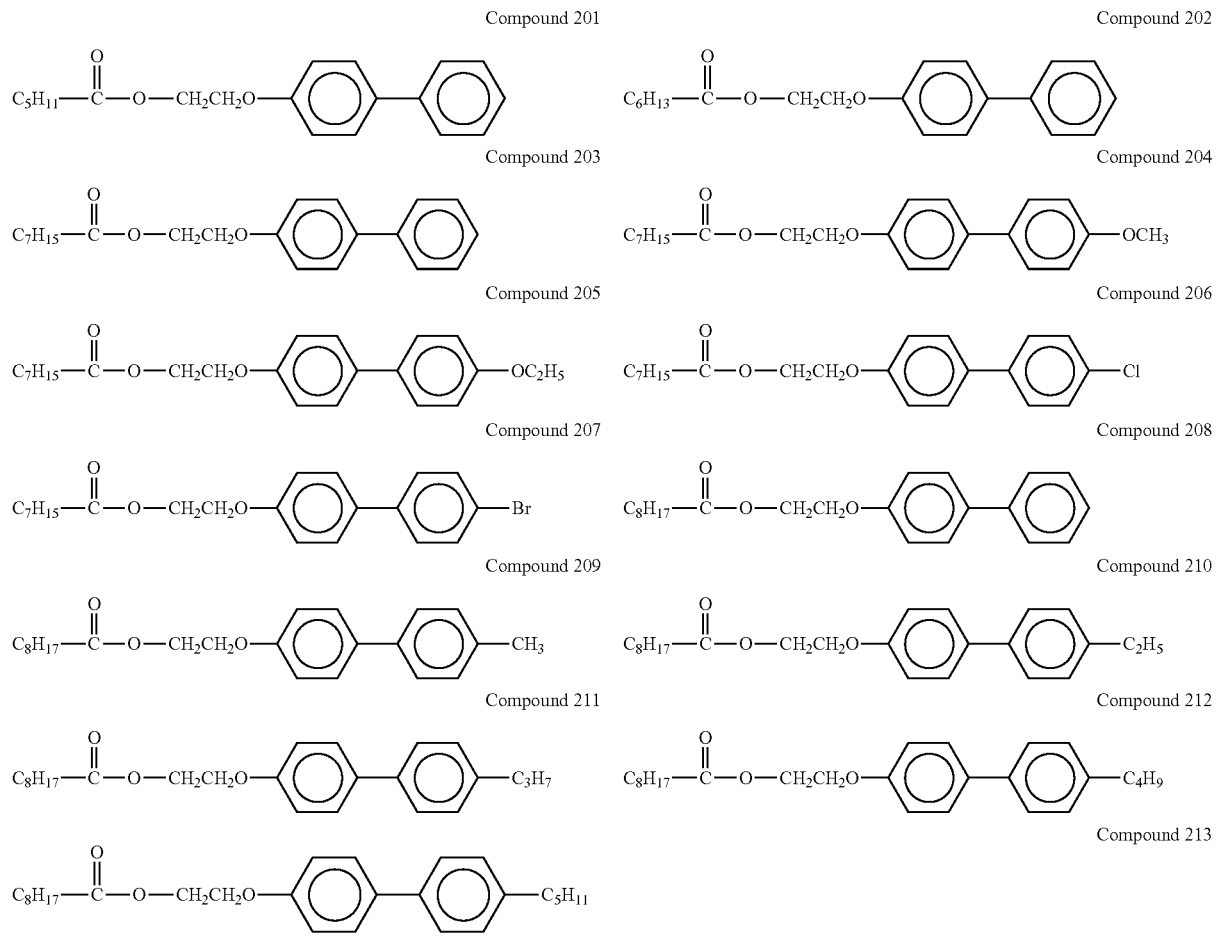
[Chem. 13]
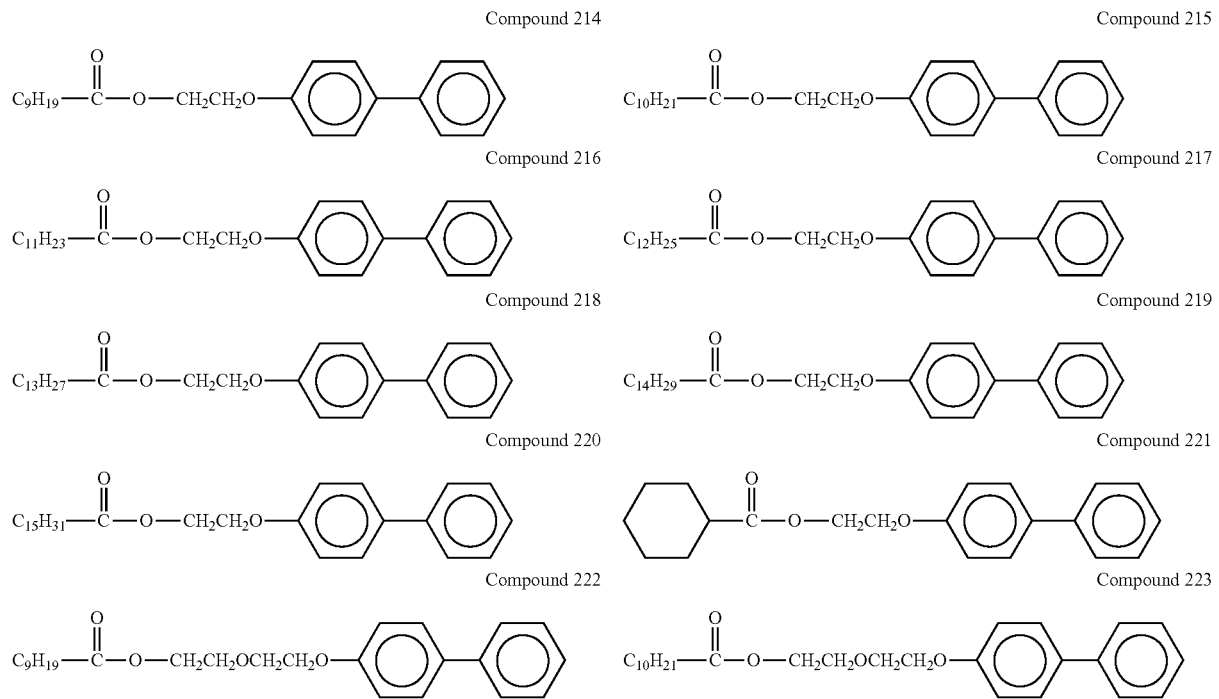

Compound 224
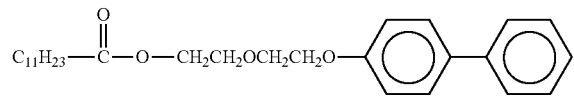
Compound 225
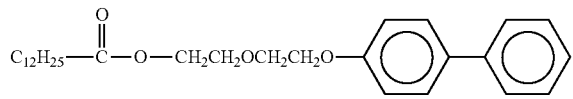
Compound 226
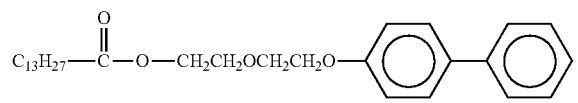
Compound 227
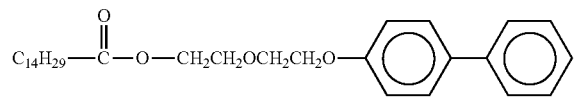
Compound 228
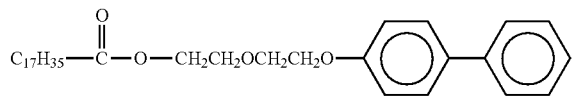
Compound 229
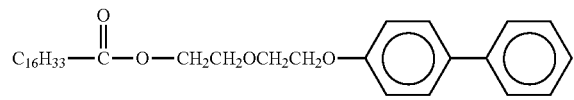
Compound 230
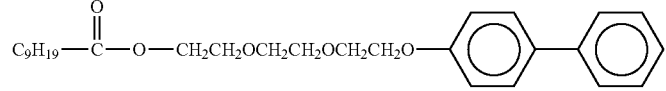... 
[Chem. 14]
Compound 231
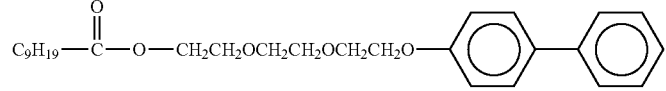
Compound 232
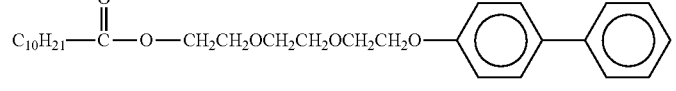
Compound 233
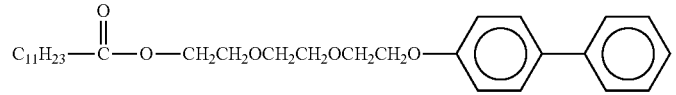
Compound 234
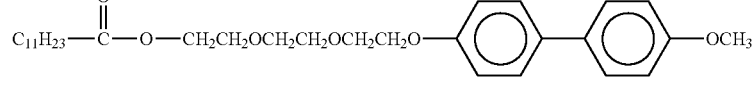
Compound 235
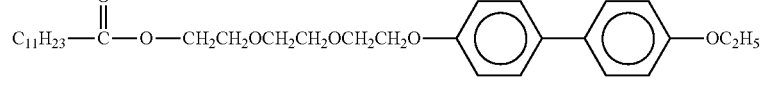
Compound 236
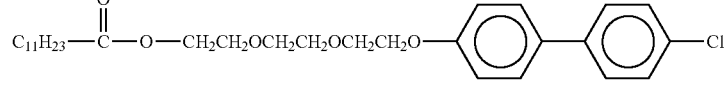
Compound 237
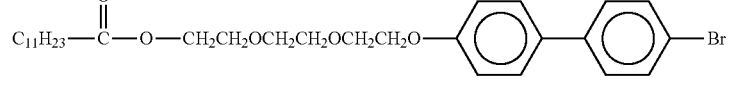
Compound 238
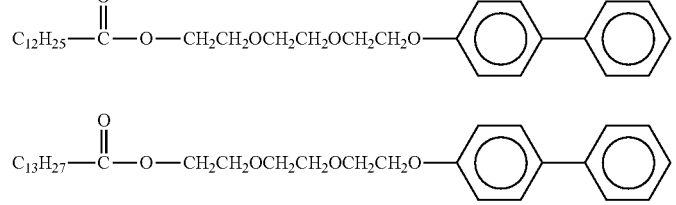
Compound 239
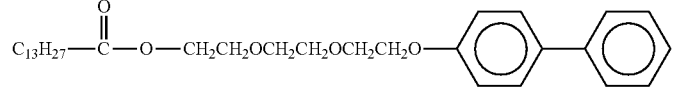

[Chem. 15]

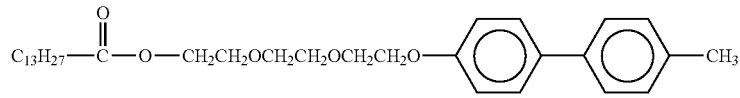

Compound 240

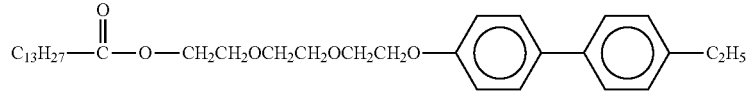

Compound 241

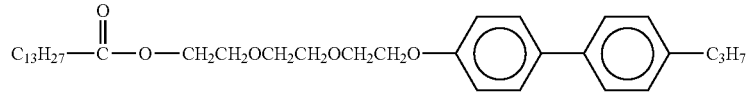

Compound 242

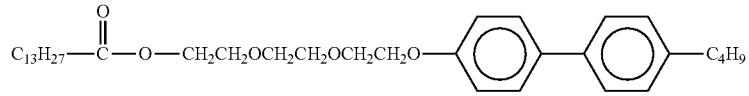

Compound 243

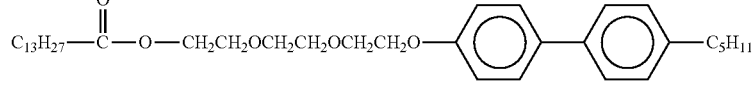

Compound 244

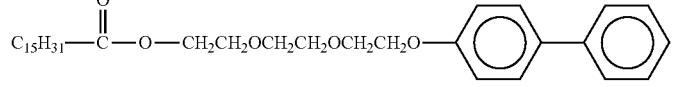

Compound 245

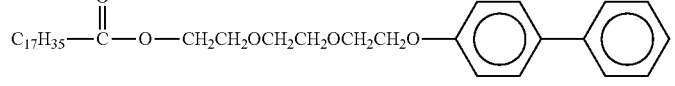

Compound 246

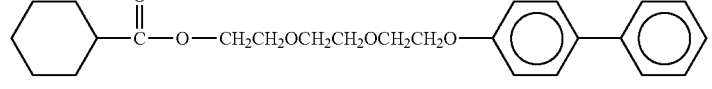

Compound 247

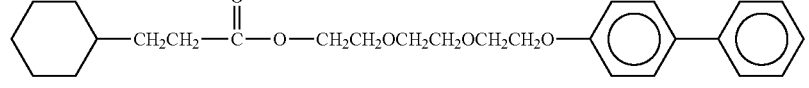

Compound 248

Incorporation of a specific ester compound allows the thermochromic color-memory composition according to the present invention to achieve a broad hysteresis width at a level equal to or greater than that of a composition using a conventional ester compound, and to have an excellent function of selectively maintaining either a color at the temperature side lower than the discoloration temperature or a color at the temperature side higher than the discoloration temperature, so that the thermochromic color-memory composition has excellent applicability to various applications.

The component (c) may contain two or more compounds represented by the formula (1) or (2). The component (c) may further contain a component (c) conventionally known, such as esters, alcohols, carboxylic acids, ketones and amides other than those of the formulas (1) and (2).

When the thermochromic color-memory composition contains a compound other than the compound represented by the formulas (1) and (2), the content thereof is preferably 1 to 30 parts by mass, more preferably 2 to 25 parts by mass, and still more preferably 3 to 20 parts by mass, with respect to the total mass of the component (c).

Although the ratio of the components (a), (b), and (c) in the present invention depends on the concentration, discoloration temperature, discoloration mode and kind of each component, the component ratio of the components (a), (b), and (c) at which desired characteristics are obtained is the component (b) within the range of preferably from 0.1 to 50, more preferably 0.5 to 20, still more preferably 2 to 20, and the component (c) within the range of preferably from 1 to 800, more preferably from 5 to 200, still more preferably 10 to 200, based on the component (a) 1 (each of the ratios is part(s) by mass).

Each component may be a mixture of two or more species.

In the present invention, the three components (a), (b), and (c) can be encapsulated in microcapsules to form a thermochromic color-memory microcapsule pigment (hereinafter also simply referred to as a microcapsule pigment). By protecting the components with a capsule membrane wall, it is needless to say that their functions will not be deteriorated even if the components are brought into contact with a chemically active substance such as an acidic substance, a basic substance or a peroxide, or with another solvent component. In addition, the heat stability can be enhanced.

Further, the microcapsule pigment can be put into practical use after forming a secondary resin coating film on the surface thereof in accordance with the intended use so as to impart the microcapsule pigment with durability or to modify the surface properties.

When the microcapsule pigment has a small average particle diameter, the dispersion stability and the processing suitability tend to improve, when blending the pigment into an ink composition, a paint, or a thermoplastic resin. Further, by forming the microcapsule pigment into fine particles, the ΔH value thereof can be increased relative to the ΔH value of the composition of the three components. When the microcapsule pigment has a large average particle diameter, on the other hand, there is a tendency that a high-density color development can be achieved. The microcapsule pigment preferably has an average particle diameter of 0.1 to 50 μm, more preferably 0.1 to 30 μm, and particularly preferably 0.5 to 20 μm. When the average particle diameter of the microcapsule pigment is within this range, the pigment has an improved practicality.

The particle diameter and the particle diameter distribution can be measured using a laser diffraction/scattering-type particle diameter distribution analyzer [manufactured by Horiba, Ltd.; LA-300], and the average particle diameter (median diameter) can be calculated based on volume from the thus measured values.

The composition ratio of the content and the membrane wall (content:membrane wall) constituting the microcapsule pigment is preferably within a range of 7:1 to 1:1 (mass ratio), and it is possible to prevent a deterioration in the color density and vividness during color development by adjusting the ratio within the above range. The composition ratio of the content and the membrane wall (content:membrane wall) is more preferably 6:1 to 1:1 (mass ratio).

Examples of the microencapsulation method include conventionally known isocyanate-type interfacial polymerization, in situ polymerization using a melamine-formalin system or the like, submerged coat hardening method, phase separation from aqueous solution, phase separation from organic solvent, melt dispersion cooling method, aerial suspension coating method, and spray drying method. The microencapsulation method is selected as needed, depending on the use purpose.

Also, an ordinarily employed dyestuff or pigment (non-thermochromic one) may be added to the microcapsule pigment to cause discoloration behavior from color (1) to color (2).

By dispersing the microcapsule pigment in a vehicle containing an additive(s) as required to be formed into an ink composition (hereinafter also simply referred to as "ink"), the resulting ink composition can be used as a thermochromic color-memory liquid composition for: (i) printing inks used in screen printing, offset printing, process printing, gravure printing, coater printing, pad printing, or the like; (ii) paints used in brush coating, spray coating, electrostatic coating, electrodeposition coating, flow coating, roller coating, dip coating, or the like; (iii) inks for writing instruments such as marking pens, ballpoint pens, fountain pens, and brush pens; (iv) inks for coating tools; (v) painting colors; (vi) cosmetics; (vii) coloring liquids for fibers; and the like.

Examples of the additive include resins, cross-linking agents, curing agents, desiccants, plasticizers, viscosity-adjusting agents, dispersants, ultraviolet absorbers, infrared absorbers, antioxidants, light stabilizers, solubilizing aids, anti-settling agents, lubricants, gelling agents, antifoaming agents, delustering agents, penetrating agents, pH regulators, foaming agents, coupling agents, humectants, antifungal agents, preservatives, and anticorrosives.

In cases where the ink according to the present invention is used as ink for a writing instrument, examples of a vehicle to be included therein include: oil-based vehicles containing an organic solvent; and aqueous vehicles containing water and, as required, an organic solvent.

Examples of the organic solvent which can be used in the present invention include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

As the ink, there may be mentioned a shear thinning ink containing a shear thinning agent in the vehicle; and a cohesive ink containing an aqueous polymeric cohesive agent in the vehicle to suspending the pigment in a loosely aggregated state.

When the ink contains a shear thinning agent, it is possible not only to suppress cohesion and sedimentation of the pigment, but also to suppress spreading of the handwriting, so that a good handwriting can be formed.

Further, in cases where a ballpoint pen is filled with the ink containing a shear thinning agent, it is possible to prevent a leakage of the ink from an interval between a ball and a tip when not being used, or to prevent a reverse flowing of the ink when a writing front-end is disposed upward (erect state).

Examples of the shear thinning agent include xanthan gum, welan gum, succinoglycan (average molecular weight is about 1,000,000 to 8,000,000) that is an organic acid modified heteropolysaccharide of which constituent monosaccharides are glucose and galactose, guar gum, locust bean gum and a derivative thereof, hydroxyethylcellulose, alkyl alginate esters, a polymer containing alkyl esters of methacrylic acid as a main component and having a molecular weight of 100,000 to 150,000, glucomannan, thickening polysaccharides having a gelation ability extracted from seaweeds such as agar or carrageenin, benzyliden sorbitol and benzyliden xylitol or a derivative thereof, a crosslinkable acrylic acid polymer, an inorganic fine particulate, polyglycerine fatty acid ester, polyoxyethylene sorbitan fatty acid ester, polyethylene glycol fatty acid ester, polyoxyethylene alkyl ether, polyoxypropylene alkyl ether, polyoxyethylene alkyl phenyl ether, a non-ionic surfactant such as fatty acid amide having an HLB value of 8 to 12, salts of dialkyl or dialkenyl sulfosuccinate, a mixture of N-alkyls-2-pyrrolidone and a anionic surfactant, and a mixture of polyvinylalcohol and an acrylic resin.

As the aqueous polymeric cohesive agent which can be used in the present invention, there may be mentioned polyvinyl pyrrolidone, polyethylene oxide, and aqueous polysaccharide.

Examples of the aqueous polysaccharides include tragacanth gum, guar gum, pullulan, cyclodextrin and aqueous cellulose derivatives; and specific examples of the aqueous cellulose derivatives include methyl cellulose, hydroxyethyl cellulose, hydroxypropyl cellulose, hydroxyethylmethyl cellulose, and hydroxypropylmethyl cellulose.

By using a comb type polymeric dispersant having carboxyl groups on its side chains and an organic nitrogen sulfur compound in conjunction with the polymeric cohesive agent, dispersibility of the loose aggregates of the microcapsule pigment due to the polymeric cohesive agent can be improved, Although the comb type polymeric dispersant having carboxyl groups on its side chains is not particularly limited as long as the comb type polymeric compound has a plurality of carboxyl groups on its side chains, an acryl polymer compound having a plurality of carboxyl groups on its side chains is preferable, and may be exemplified by trade name: SOLSPERSE 43000 manufactured by Lubrizol, Co. Ltd. in Japan as the above compound.

The organic nitrogen sulfur compound further suppresses sedimentation of the microcapsule pigment due to vibration when the ink is filled in a writing instrument or the like for practical use.

This further improves dispersibility that the loose aggregates of the microcapsule pigment are dispersed by the comb type polymeric dispersant having carboxyl groups on its side chains.

As the organic nitrogen sulfur compound, a compound selected from thiazole-based compounds, isothiazole-based compounds, benzothiazole-based compounds, and benzoisothiazole-teased compounds, is used.

As specific examples of the organic nitrogen sulfur compound, one or two or more compounds selected from 2-(4-thiazoyl)-benzimidazole (TBZ), 2-(thiocyanatemethylthio)-1,3-benzothiazol (TCMTB), 2-methyl-4-isothiazolin-3-one, and 5-chloro-2-methyl-4-isothiazolin-3-one are used, and preferably, one or two or more compounds selected from 2-(4-thiazoyl)-benzimidazole (TBZ), 2-methyl-4-isothiazolin-3-one, and 5-chloro-2-methyl-4-isothiazolin-3-one are used.

The organic nitrogen sulfur compound may be exemplified by trade name: TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800, and TOPSIDE 950, manufactured by Permachem Asia Ltd.; and trade name: HOKUSTAR HP, HOKUSTAR E50A, HOKUSIDE P200, HOKUSIDE 6500, HOKUSIDE 7400, HOKUSIDE MC, HOKUSIDE 369, and HOKUSIDE R-150 manufactured by Hokko Sangyo Co. Ltd.

The mass ratio of the comb type polymeric dispersant having carboxyl groups on its side chains and the organic nitrogen sulfur compound is preferably 1:1 to 1:10, and more preferably 1:1 to 1:5. By satisfying the above range, it is possible to sufficiently develop dispersibility of the loose aggregates of the microcapsule pigment and suppression of the sedimentation of the microcapsule pigment by vibration.

Further, addition of an aqueous resin allows for imparting the ink with fixability on paper surface of the handwriting and viscosity. The aqueous resin also has an effect of further improving stability of the microcapsule pigment in the ink including the above-described comb type polymeric dispersant having carboxyl groups on its side chains and the organic nitrogen sulfur compound.

Examples of the aqueous resin include alkyd resins, acrylic resins, styrene maleic acid copolymers, cellulose derivatives, polyvinylpyrrolidones, polyvinyl alcohols, and dextrin, among which a polyvinyl alcohol is preferably used.

Further, among the polyvinyl alcohols, a partial saponification type polyvinyl alcohol having a degree of saponification of 70 to 89% by mol is more suitably used because it has good solubility even when the pH of the ink is in an acidic range.

The aqueous resin is added to the ink in an amount within the range of 0.3 to 3.0% by mass, and preferably 0.5 to 1.5% by mass.

Moreover, in the case where the ink is used with being filled in a ballpoint pen, it is preferable that the abrasion of a ball receiving sheet is prevented by adding lubricants including higher fatty acids such as oleic acid, non-ionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof.

Furthermore, in the case of adding 2,5-dimercapto-1,3,4-thiadiazole and/or a salt thereof to the ink, it is possible to suppress dispersion defects or aggregation of the microcapsule pigment occurring after a frozen ink thawed again even when the pH of the ink is in an acidic or alkaline region, to prevent an increase of viscosity of the ink or the accompanying disconnection of the handwriting or color lightening, and further to prevent corrosion of a ball when the ink is used in a ballpoint pen.

In addition, the following may be added to the ink, if necessary: (i) a resin which imparts the ink with fixability on paper surface and viscosity, such as an acrylic resin, a styrene-maleic acid copolymer, a cellulose derivative, polyvinylpyrrolidone, polyvinyl alcohol, or dextrin; (ii) an inorganic salt such as sodium carbonate, sodium phosphate, or sodium acetate; or a pH regulator, for example, an organic basic compound such as an aqueous amine compound; (iii) an anticorrosive such as benzotriazole tolyltriazole, dicyclohexylammonium nitrite, diisopropylammonium nitrite, or saponin; (iv) a preservative or an antifungal agent, such as phenol, sodium salt of 1,2-benzthiazolin-3-one, sodium benzoate, sodium dehydroacetate, potassium sorbate, paraoxypropylbenzoate, or 2,3,5,6-tetrachloro-4-(methylsulfonyl) pyridine; (v) a wetting agent such as urea, a non-ionic surfactant, a reduced or non-reduced starch hydrolysate, an oligosaccharide such as trehalose, sucrose, cyclodextrin, glucose, dextrin, sorbitol, mannitol, or sodium pyrophosphate; (vi) an antifoaming agent; (vii) a dispersant; and/or (viii) a fluorine-based or non-ionic surfactant which improves the permeability of the ink.

The ink can contain the thermochromic color-memory microcapsule pigment in an amount of preferably 5 to 40% by mass, more preferably 10 to 40% by mass, and still more preferably 10 to 30% by mass, with respect to the total mass of the ink. By controlling the amount of the microcapsule pigment in this range, a desirable color development density can be achieved and deterioration of the ink outflow properties can be inhibited.

A writing instrument capable of storing the ink according to the present invention will now be described. In one embodiment, the writing instrument includes: an axial barrel which stores the ink; and a pen body which delivers the ink stored in the axial barrel. Examples of the pen body include a marking pen body, a ballpoint pen body, and a brush pen body. Examples of the marking pen body include marking tips such as fiber tips, felt tips, and plastic tips. Examples of the ballpoint pen body include ballpoint pen tips. Examples of the brush pen body include fiber bundles in which fibers are tightly bundled with each other along the longitudinal direction; plastic porous articles having continuous pores;

heat-fused or resin-processed articles of synthetic resin fibers; and extrusion-molded articles of a soft resin or an elastomer.

The use of the ink according to the present invention in a ballpoint pen or a marking pen will now be described in more detail.

In the case where the ink according to the present invention is filled in a ballpoint pen, the structure and shape of the ballpoint pen itself are not particularly limited. Examples thereof includes a ballpoint pen having an ink-storing tube in which a shear thinning ink is filled in an axial barrel, in which the ink-storing tube is connected with a ballpoint pen tip where a ball is mounted on its front-end, and a liquid plug for preventing backflow is closely contacted in the edge of the ink in the ink-storing tube.

The ballpoint pen tip will be explained in more detail. There can be applied a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring.

The ball made of cemented carbide, stainless steel, ruby, ceramic, resin, rubber, and the like, and having a diameter of about 0.3 to 2.0 mm, preferably 0.3 to 1.5 mm, and more preferably 0.3 to 1.0 mm can be applicable.

As the ink-storing tube which stores the ink, for example, a molded article made of a thermoplastic resin such as polyethylene, polypropylene, polyethylene terephthalate, or nylon or a metal tube can be used.

The ink-storing tube may be directly connected with the tip, or the ink-storing tube may be connected with the tip via a connection member.

Incidentally, the ink-storing tube may be a refill type in which the refill is stored in an axial barrel made of a resin or metal, or the ink may be directly filled in an axial barrel in which the axial barrel mounting a tip in its front-end is used itself as an ink-storing tube.

Moreover, in the case where the ink is stored in a retractable ballpoint pen, the structure and shape of the retractable ballpoint pen are not particularly limited, and any structure can be adopted so long as the writing front-end provided in the ballpoint pen refill is received in the axial barrel while being exposed to the atmosphere and the writing front-end is protruded from the opening part of the axial barrel by actuation of the in-and-out type mechanism.

The retractable ballpoint pens can be classified into, for example, knock-type ballpoint pens rotation-type ballpoint pens, and slide-type ballpoint pens.

The knock-type ballpoint pens can take, for example, a configuration in which a knocking part is arranged on the rear end or side of the axial barrel and the ballpoint pen tip is projected from the front-end opening of the axial barrel by pushing the knocking part, or a configuration in which the ballpoint pen tip is projected from the front-end opening of the axial barrel by pushing a clip arranged on the axial barrel.

The rotation-type ballpoint pens can take, for example, a configuration in which a rotary part is arranged on a rear part of the axial barrel and the ballpoint pen tip is projected and retracted through the front-end opening of the axial barrel by rotating the rotary part.

The slide-type ballpoint pens can take, for example, a configuration in which a slide is arranged on the side of the axial barrel and the ballpoint pen tip is projected and retracted through the front-end opening of the axial barrel by operating the slide, or a configuration in which the ballpoint pen tip is projected and retracted through the front-end opening of the axial barrel by sliding a clip arranged on the axial barrel.

The retractable ballpoint pens may be of a complex type in which a plurality of ballpoint pen refills are stored in the axial barrel and the writing end of any one of the ballpoint pen refills is projected and retracted through the front-end opening of the axial barrel by the action of a projection-retraction mechanism.

In general, an ink follower is filled at the end face at the rear end of the ink stored in the ink-storing tube.

The composition of the ink follower includes a non volatile liquid or a hardly volatile liquid.

Specific examples thereof include vaseline, spindle oil, castor oil, olive oil, mineral oil refineries, liquid paraffine, polybutene, α-olefine, oligomer and cooligomer of α-olefine, dimethyl silicone oil, methylphenyl silicone oil, amino modified silicone oil polyether modified silicone oil, and fatty add modified silicone oil. It can be used alone or in combination of two or more thereof.

It is preferable that the viscosity of the non-volatile liquid and/or hardly volatile liquid is increased to a suitable viscosity by adding a thickening agent. There may be mentioned, as the thickening agent, silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

The liquid ink follower may be used in combination with a solid ink follower.

In the case where the ink according to the present invention is filled in a marking pen, the structure and shape of the marking pen itself are not particularly limited. Examples thereof includes a marking pen in which an ink occlusion body containing fiber bundle is embedded in an axial barrel, a marking pen tip containing a processed fiber having a capillary gap therein is mounted directly or via a connection member on the axial barrel, and a cohesive ink is impregnated in the ink occlusion body of the marking pen formed by connecting the ink occlusion body and the tip, or a marking pen in which the tip and the ink-storing tube are arranged through a valve body that opens by pressing the tip and the ink is directly stored in the ink-storing tube.

The tip is a generally known porous member having communication pores of which porosity is selected within the range of about 30 to 70%, made of processed resin of fibers, fusion processed bodies of hot-melt fiber, or a felt, and the tip is provided for practical use by processed its one end in a cannonball form, a rectangular form, or a chisel form depending on the purpose.

The ink occlusion body is configured by bundling crimped fibers in a length direction, incorporating them into a covering material such as a plastic tube or a film, and adjusting its porosity within a range of about 40 to 90%.

As the valve body, a generally known pumping type may be used, and also it is preferred the one in which a spring pressure is adjusted so that the valve can be opened by pen pressure.

The shape of the ballpoint pen or marking pen is not limited to the above-described one, but may be a both head type writing instrument in which tips of different type are provided or pen ends for introducing inks of different colors are provided.

A handwriting produced by writing on a writing surface using a writing instrument containing the ink according to the present invention is allowed to change its color by the work of a heating tool or cooling tool.

As the heating tool, for example, an electro-heating discoloration device equipped with a resistance heating element, a heating discoloration device loaded with hot water or the like, or a hair dryer can be suitably used; however, a friction member is preferably used as a means which enables discoloration by a simple method. Particularly, an elastic material that is not abraded by rubbing is preferred.

The friction member is preferably an elastic material such as an elastomer or foamed plastic, which has excellent elasticity and is capable of generating appropriate friction when rubbed and thereby producing frictional heat.

A handwriting can also be rubbed with an ordinary rubber eraser used for erasing handwriting with a pencil; however, since eraser crumbs are generated by the rubbing, the above-described friction member which hardly generates such crumbs is preferably used.

As the material of the friction member, for example, a silicone resin, an SEBS resin (styrene-ethylene-butadiene-styrene block copolymer), an SEPS resin (styrene-ethylene-propylene-styrene block copolymer), a polyester resin, EPDM, or the like is used.

The friction member can be combined with a writing instrument and other member having an arbitrary shape (friction body) to obtain a writing instrument set, and excellent portability is attained by arranging the friction member on the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing end is not arranged), or on the knocking part.

As the cooling tool, for example, a cryogenic discoloration device utilizing a Peltier element, a cryogenic discoloration device loaded with a refrigerant such as cold water or crushed ice, a refrigerator, or a freezer can be suitably used.

The material of the support on which the thermochromic color-memory liquid composition is applied or printed is not limited and every material is effective, and its examples include paper, synthetic paper, fiber, fabric, synthetic leather, leather, plastics, glass, pottery materials, metals, wood, and stone, which may be not only in a flat shape but also in an irregular form.

By arranging a reversibly thermochromic layer containing the thermochromic color-memory composition on the support, a laminate (printed article) can be obtained.

In cases where a non-thermochromic colored layer (including an image) has been formed on the support in advance, the colored layer can be made visible or invisible depending on temperature change by applying thereto a reversibly thermochromic layer, and this enables to further diversify the mode of change.

Further, the microcapsule pigment can also be melt-blended with a thermoplastic resin, thermosetting resin, wax, or the like into the form of a pellet, powder, or paste and utilized as a resin composition for thermochromic color-memory molded article. By a widely used means such as injection molding, extrusion molding, blow molding, or cast molding, a molded article in the form of a three-dimensional article of an arbitrary shape, film, sheet, plate, filament, rod, pipe, or the like can be obtained.

Moreover, a crayon can also be obtained by melt-blending the thermochromic color-memory microcapsule pigment into a thermoplastic resin or wax.

Also, an ordinarily employed dyestuff or pigment (non thermochromic one) may be added to the liquid composition or resin composition to cause discoloration behavior from color (1) to color (2).

It is possible to improve light resistance of the product by laminating a layer containing a light stabilizer and/or transparent metalescent pigment over the laminated product or the molded product formed by using the resin composition, or it is possible to improve durability of the product by providing a topcoat layer thereon.

Examples of the light stabilizer include ultraviolet absorbers, antioxidants, singlet oxygen quenchers, superoxide anion quenchers, and ozone quenchers.

Examples of the transparent metallic luster pigment include pigments prepared by coating the surface of a core substance, such as natural mica, synthetic mica, glass piece, alumina, or transparent film piece, with a metal oxide such as titanium oxide.

Specific examples of products including any of the thermochromic color-memory composition, the microcapsule pigment, and the ink are listed below, (1) Toys:

dolls and animal-figured toys; hair of dolls and animal-figured toys; dollhouses and furnitures thereof; doll accessories such as clothes, hats, bags, and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings, and food articles; and the like (2) Clothing:

outerwears such as T-shirts, sweaters, blouses, dresses, swimsuits, raincoats, and ski wears; footwears such as shoes and shoelaces; personal effects made of cloth, such as handkerchiefs, towels, and wrapping cloths; gloves; neckties; hats; and the like (3) Interior Ornaments:

rugs, curtains, curtain cords, tablecloths carpets, cushions, picture frames, imitation flowers, photo stands, and the like (4) Furnitures:

beddings such as bedclothes, pillows, and mattresses; lighting fixtures; air conditioners; and the like (5) Accessories:

rings, bracelets, tiaras, earrings, hair stoppers, artificial nails, ribbons, scarfs, watches, glasses, and the like (6) Stationeries:

writing instruments, stamps, erasers, celluloid boards, rulers, adhesive tapes, and the like (7) Daily Necessaries:

cosmetics such as lipsticks, eye-shadows manicures, hair dyes, artificial nails, and paints for artificial nails; toothbrushes; and the like (8) Kitchen Utensils:

cups, dishes, chopsticks, spoons, forks, pots, frying pans, and the like (9) Other Products:

various printed articles, such as calendars, labels, cards, recording materials, and those for forgery prevention; books such as illustrated books; bags; packaging containers;

embroidery threads; sporting gears; coasters; musical instruments; pocket warmers; refrigerants; pouches such as wallets; umbrellas; vehicles; buildings; indicators for temperature detection; training and learning articles; and the like.

EXAMPLES

Examples of the present invention will be described below; however, the present invention is not restricted thereto.

The preparation process of a thermochromic color-memory composition and a microcapsule pigment encapsulating the same therein in respective Examples, and the measuring method of hysteresis characteristics depending on temperature change of the thermochromic color-memory composition or microcapsule pigment, will hereinafter be described.

Incidentally, the term "part(s)" in the following Examples means part(s) by mass.

First, an example including the ester compound represented by the formula (1) as the component (c) is shown.

Example 101

Preparation Process of Thermochromic Color Memory Composition

A thermochromic color-memory composition was obtained by mixing three components composed of 1 part of 3-(2-ethoxy-4-diethylaminophenyl)-3-(1-ethyl-2-methylindol-3-yl)-4-azaphthalide as the component (a), 2 parts of 2,2-bis(4-hydroxyphenyl)hexafluoropropane as the component (b), and 50 parts of a diester (compound 125) of 1,3-bis(2-hydroxyethoxy)benzene and cyclohexanecarboxylic acid and 3 parts of stearyl laurate as the component (c), followed by heating to homogeneously dissolve them.

The thermochromic color memory composition changed color from blue to colorless.

Preparation of Measuring Sample

The thermochromic color-memory composition was charged into a transparent glass capillary having an inner diameter of 1 mm and a length of 78 mm to a height of about 10 mm from the bottom of the capillary, whereby a measuring sample was obtained.

Measurement of Discoloration Temperature

The whole part of the portion in which the thermochromic color-memory composition had been charged among the measuring sample was immersed in water. While the temperature of the water was changed, the discoloring state of the thermochromic color-memory composition was visually observed to measure $T_1$ (complete coloring temperature), $T_2$ (coloring starting temperature), $T_3$ (decoloring starting temperature) and $T_4$ (complete decoloring temperature), and $T_H$ [temperature at a midpoint between $T_1$ and $T_2$, $(T_1+T_2)/2$], $T_G$ [temperature at a midpoint between $T_3$ and $T_4$; $(T_3+T_4)/2$], and $\Delta H$ (hysteresis width; $T_G-T_H$) were determined.

The thermochromic color-memory composition of Example 101 showed hysteresis characteristics of $T_1$: 24° C., $T_2$: 28° C., $T_3$: 46° C., $T_4$: 64° C., $T_H$: 26° C., $T_G$: 55° C., and $\Delta H$: 29° C.

Example 102

Preparation Process of Microcapsule Pigment

Thermochromic color-memory composition composed of 1 part of 3-(2-ethoxy-4-diethylaminophenyl)-3-(1-ethyl-2-methylindol-3-yl)-4-azaphthalide as the component (a), 5 parts of 2,2-bis(4-hydroxyphenyl)hexafluoropropane as the component (b), and 50 parts of a diester (compound 114) of 1,4-bis(2-hydroxyethoxy)benzene and cyclohexane propionic acid as the component (c) was mixed and uniformly melted by heating. The resultant was further mixed with 20 parts of an aromatic polyvalent isocyanate prepolymer as a membrane wall material and 40 parts of ethyl acetate, and the resulting solution was added to 100 parts of a 15% aqueous gelatin solution and emulsion-dispersed to form microdroplets.

After continuously stirring the thus obtained dispersion at 70° C. for about 1 hour, an aqueous solution obtained by dissolving 2 parts of an aqueous amine compound (manufactured by Mitsubishi Chemical Corporation, trade name: jER CURE U; an amine adduct of epoxy resin) in 23 parts of water was slowly added thereto with stirring, and the resultant was further continuously stirred for about 3 hours with the temperature thereof being maintained at 90° C., thereby obtaining a microcapsule pigment suspension.

The microcapsule pigment was isolated from the microcapsule pigment suspension by centrifugal separation, thereby a microcapsule pigment changing color from blue to colorless was obtained (average particle diameter: 1.7 μm).

Preparation of Measuring Sample

An ink was prepared by uniformly dispersing 40 parts of the microcapsule pigment in an aqueous ink vehicle composed of 50 parts of an ethylene-vinyl acetate resin emulsion, 1 part of a leveling agent, 1 part of an antiforming agent, 0.5 parts of a viscosity regulator, and 7.5 parts of water. A measuring sample was obtained by screen-printing a solid pattern on a high-quality paper by using this ink.

Measurement of Hysteresis Characteristics

The measuring sample was placed in the measurement portion of the colorimeter (TC-3600 type colorimeter, manufactured by Tokyo Denshoku, Co., Ltd.), temperature of the sample portion was increasing or decreasing at a speed of 2° C./min to measure a brightness value as color density at each temperature, to thereby plot a color density-temperature curve. From the color density-temperature curve, $T_1$, $T_2$, $T_3$, $T_4$, $T_H$ [temperature at a midpoint between $T_1$ and $T_2$: $(T_1+T_2)/2$], $T_G$ [temperature at a midpoint between $T_3$ and $T_4$: $(T_3+T_4)/2$], and $\Delta H$ (hysteresis width: $T_G-T_H$) were determined.

The microcapsule pigment of Example 102 showed hysteresis characteristics of $T_1$: −4° C., $T_2$: 4° C., $T_3$: 64° C., $T_4$: 80° C., $T_H$: 0° C., $T_G$: 72° C., and $\Delta H$: 72° C.

Examples 103 to 106

In the same manner as in Example 102 except that the component (a) and the component (c) of the thermochromic color-memory composition encapsulated in microcapsules and blending amounts thereof were changed to the compounds and the blending amounts as listed in Table 1 below, microcapsule pigments of Examples 103 to 106 were prepared and their hysteresis characteristics were measured in the same manner as in Example 102.

TABLE 1

| Example | Component (a) | Blending amount | Component (b) | Blending amount | Component (c) | Blending amount | Average particle diameter (μm) |
|---|---|---|---|---|---|---|---|
| 102 | P | 1 | 2,2-bis(4-hydroxyphenyl)hexafluoropropane | 5 | Diester of 1,4-bis(2-hydroxyethoxy)benzene and cyclohexane propionic acid (compound 114) | 50 | 1.7 |
| 103 | Q | 2 | 2,2-bis(4-hydroxyphenyl)hexafluoropropane | 5 | Diester of 1,4-bis(2-hydroxyethoxy)benzene and cyclohexane propionic acid (compound 114) | 50 | 2.0 |
| 104 | R | 3 | 2,2-bis(4-hydroxyphenyl)hexafluoropropane | 5 | Diester of 1,4-bis(2-hydroxyethoxy)benzene and cyclohexane propionic acid (compound 114) | 50 | 2.0 |
| 105 | P | 1 | 2,2-bis(4-hydroxyphenyl)hexafluoropropane | 5 | Diester of 1,3-bis(2-hydroxyethoxy)benzene, and cyclohexanecarboxylic acid (compound 125) | 50 | 2.1 |
|  |  |  |  |  | Diester of 1,3-bis(2-hydroxyethoxy)benzene and palmitic acid | 2 |  |
| 106 | P | 1 | 2,2-bis(4-hydroxyphenyl)hexafluoropropane | 5 | Diester of 1,3-bis(2-hydroxyethoxy)benzene and cyclohexane propionic acid (compound 232) | 50 | 1.9 |
|  |  |  |  |  | Benzil stearate | 3 |  |

P of the component (a) in the table is 3-(2-ethoxy-4-diethylaminophenyl)-3-(1-ethyl-2-methylindol-3-yl)-4-azaphthalide, Q is 1,2-benz-6-(N-ethyl-N-isoamylamino) fluorane, and R is 2-(2-chloroanilino)-6-di-n-butylaminofluorane. Further, in Table 1, the amounts are given in parts by mass.

Color changes and values of $T_1$, $T_2$, $T_3$, $T_4$, $T_H$, $T_G$, and $\Delta H$ of the microcapsule pigments of Examples 102 to 106 are shown in Table 2 below.

TABLE 2

| Example | Color change During color development ↔ during decoloration | Discoloration characteristics (°C.) | | | | | | |
|---|---|---|---|---|---|---|---|---|
|  |  | $T_1$ | $T_2$ | $T_3$ | $T_4$ | $T_H$ | $T_G$ | $\Delta H$ |
| 102 | Blue ↔ colorless | −4 | 4 | 64 | 80 | 0 | 72 | 72 |
| 103 | Pink ↔ colorless | −8 | 2 | 57 | 77 | −3 | 67 | 70 |
| 104 | Black ↔ colorless | −9 | 1 | 55 | 75 | −4 | 65 | 69 |
| 105 | Blue ↔ colorless | −30 | −4 | 39 | 59 | −17 | 49 | 66 |
| 106 | Blue ↔ colorless | −16 | −10 | 38 | 58 | −13 | 48 | 61 |

Comparative Examples 101 to 103

As a comparative example, the thermochromic color-memory composition described in Table 3 below was used, and a microcapsule pigment was prepared in the same manner as in Example 102 to measure the hysteresis characteristics in the same manner as in Example 102.

TABLE 3

| Example | Component (a) | Blending amount | Component (b) | Blending amount | Component (c) | Blending amount | Average particle diameter (μm) |
|---|---|---|---|---|---|---|---|
| 101 | P | 1 | 2,2-bis(4-hydroxyphenyl)hexafluoropropane | 5 | Diester of 1,4-bis(2-hydroxyethoxy)benzene and n-nonanoic acid | 50 | 1.7 |
| 102 | P | 1 | 2,2-bis(4-hydroxyphenyl)hexafluoropropane | 5 | Diester of 1,3-bis(2-hydroxyethoxy)benzene and n-heptanoic acid | 50 | 2.1 |

TABLE 3-continued

| Example | Component (a) | Blending amount | Component (b) | Blending amount | Component (c) | Blending amount | Average particle diameter (μm) |
|---|---|---|---|---|---|---|---|
| 103 | P | 1 | 2,2-bis(4-hydroxyphenyl)hexafluoropropane | 5 | Diester of 1,3-bis(2-hydroxyethoxy)benzene and palmitic acid | 2 | 1.9 |
| | | | | | Diester of 1,3-bis(2-hydroxyethoxy)benzene and n-nonanoic acid | 50 | |
| | | | | | Benzil stearate | 3 | |

Color changes and values of $T_1$, $T_2$, $T_3$, $T_4$, $T_H$, $T_G$, and ΔH of the microcapsule pigments of Comparative Examples 101 to 103 are shown in Table 4 below.

TABLE 4

| Comparative Example | Color change During color development ↔ during decoloration | Discoloration characteristic (° C.) | | | | | | |
|---|---|---|---|---|---|---|---|---|
| | | $T_1$ | $T_2$ | $T_3$ | $T_4$ | $T_H$ | $T_G$ | ΔH |
| 101 | Blue ↔ colorless | 10 | 16 | 55 | 75 | 13 | 65 | 52 |
| 102 | Blue ↔ colorless | −8 | 0 | 32 | 44 | −4 | 38 | 42 |
| 103 | Blue ↔ colorless | −14 | 4 | 34 | 50 | −5 | 42 | 47 |

Comparative Example 101 is an example in which the cycloalkylalkyl group of the component (c) (compound 114) of Example 102 is replaced with a linear alkyl group having the same carbon number. While ΔH of Example 102 is 72° C., ΔH of Comparative Example 101 is 52° C. By having a cycloalkylalkyl group in the compound of the component (c), ΔH becomes larger, and the color-memory property can be maintained in a wide temperature range.

Comparative Example 102 is an example in which the cycloalkyl group of the component (c) (compound 125) of Example 105 is replaced with a linear alkyl group having the same carbon number. While Δ of Example 105 is 66° C., ΔH of Comparative Example 102 is 42° C. By having a cycloalkyl group in the compound of the component (c), ΔH becomes larger, and the color-memory property can be maintained in a wide temperature range.

Comparative Example 103 is an example in which the cycloalkylalkyl group of the component (c) (compound 132) of Example 106 is replaced with a linear alkyl group having the same carbon number. While ΔH of Example 106 is 61° C., ΔH of Comparative Example 103 is 47° C. By having a cycloalkyl group in the compound of the component (c), ΔH becomes larger, and the color-memory property can be maintained in a wide temperature range.

Application Example 101

An ink for a writing instrument was prepared by uniformly dispersing 27 parts of the microcapsule pigment prepared in Example 106 (which had been cooled to −16° C. or lower to develop a blue color in advance) in an aqueous ink vehicle composed of 0.3 parts of succinoglycan (shear-thinning agent), 3.0 parts of a sugar mixture [manufactured by Sanwa Starch Co., Ltd., trade name: SANDS 70], 0.5 parts of a phosphate ester-based surfactant, 0.1 parts of an antifungal agent, 1.0 parts of triethanolamine, and 68.1 parts of water.

Preparation of Writing Instrument

An ink-storing tube made of a polypropylene pipe was filled by suction with the ink and connected, via a holder made of a resin, with a ballpoint pen tip holding a 0.5 mm stainless steel ball on its front end.

Then, a viscoelastic ink follower (liquid plug) containing polybutene as a main component was filled from the rear end of the polypropylene pipe to obtain a ballpoint pen refill.

This ballpoint pen refill was incorporated into an axial barrel to obtain a writing instrument (retractable ballpoint pen).

This writing instrument had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on the side of the axial barrel.

On the rear end of the axial barrel, a friction member made of an SEBS resin was arranged.

With the end of the ballpoint pen tip being projected from the front-end opening of the axial barrel by the action of the projection-retraction mechanism, a blue letter (handwriting) was formed by writing on a sheet of paper.

When this handwriting was rubbed with the SEBS resin-made friction member arranged on the rear end of the axial barrel, the letter was decolored to colorless, and this state could be maintained under room temperature.

Meanwhile, when the sheet of paper after the decoloration was cooled to a temperature of −16° C. or lower, the letter showed a discoloration behavior of turning blue again, and this behavior was repeatedly reproducible.

Application Example 102

An ink for a writing instrument was prepared by uniformly dispersing 27 parts of the microcapsule pigment prepared in Example 105 (which had been cooled to −30° C. or lower to develop a blue color in advance) into an aqueous ink vehicle composed of 0.33 parts of xanthan gum (shear thinning agent), 10.0 parts of urea, 10 parts of glycerin, 0.6 parts of a nonionic surfactant, 0.1 parts of a modified silicone antifoaming agent, 0.2 parts of an antifungal agent, and 51.77 parts of water.

Preparation of Writing Instrument

A polypropylene pipe was filled by suction with the ink and connected, via a holder made of a resin, with a ballpoint pen tip holding a 0.5 mm stainless steel ball on its front end.

Next, an ink follower (liquid plug) containing polybutene as a main component and having viscoelasticity was filled from the rear end of the polypropylene pipe, and a tail plug was fitted in the rear portion of the pipe. A front axial barrel and a rear axial barrel were assembled, a cap was fitted thereto, and then degassing treatment was carried out by centrifugation, whereby a writing instrument (ballpoint pen) was obtained.

The rear portion of the rear axial barrel has a rubber made of SEBS attached as a frictional body.

Using the writing instrument, a blue letter (handwriting) was formed by writing on a sheet of paper.

The handwriting showed blue at room temperature (25° C.), but the letter discolored and became colorless when the letter was rubbed using the frictional body. This state could be maintained under room temperature.

Meanwhile, when the sheet of paper after the decoloration was cooled to a temperature of −30° C. or lower, the letter showed a discoloration behavior of turning blue again, and this behavior was repeatedly reproducible.

Application Example 103

An ink for a writing instrument was prepared by mixing 25 parts of the microcapsule pigment prepared in Example 106 (which had been cooled to −16° C. or lower to develop a blue color in advance) with 0.5 parts of hydroxyethyl cellulose, 0.2 parts of a comb type polymer dispersant [manufactured by Lubrizol Japan Ltd., trade name: SOL-SPERSE 43000], 1.0 parts of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 25.0 parts of glycerin, 0.02 parts of an antifoaming agent, and 47.78 parts of water.

Preparation of Filled-In Type Writing Instrument

An ink absorbent prepared by covering a polyester sliver with a synthetic resin film was impregnated with the ink and inserted into an axial barrel made of a polypropylene resin. Then, the axial barrel was assembled with a resin-processed pen body (cannonball shape) made of polyester fibers via a holder in such a manner that the front end of the axial barrel was in connection with the pen body, and a cap was fitted thereto to obtain a writing instrument (marking pen).

The rear end portion of the axial barrel has an SEBS resin attached as a friction member.

Using the writing instrument, a blue letter (handwriting) was formed by writing on a sheet of paper.

The handwriting showed blue at room temperature (25° C.), but the letter discolored and became colorless when the letter was rubbed using the frictional body. This state could be maintained under room temperature.

Meanwhile, when the sheet of paper after the decoloration was cooled to a temperature of −16° C. or lower, the letter showed a discoloration behavior of turning blue again, and this behavior was repeatedly reproducible.

Application Example 104

A paint was prepared by uniformly dispersing 2.5 parts of the thermochromic color-memory microcapsule pigment prepared in Example 102 and 1.5 parts of a non-thermochromic fluorescent pink pigment in an oil-based ink vehicle composed of 12.5 parts of a vinyl chloride-vinyl acetate copolymer resin, 38.3 parts of xylene, 45 parts of butyl acetate, and 0.2 parts of a viscosity-adjusting agent.

After allowing the thus obtained paint to change its color to purple by cooling it to a temperature of −4° C. or lower, the paint was applied by spray-coating on a plug part (white) of a household electric cord to form a reversibly thermochromic layer, thereby obtaining a thermochromic color-memory plug.

The plug showed a purple color at room temperature (25° C.); however, when heated, it turned pink at a temperature of 80° C. or higher. When the plug was cooled from this discolored state, it again showed a purple color at a temperature of −4° C. or lower.

Once this thermochromic color-memory plug turns pink at a temperature of 80° C. or higher, it is capable of maintaining a discolored state in pink unless it is cooled to a temperature of −4° C. or lower. This enabled the temperature history when the plug was abnormally overheated and reached a high-temperature range of 80° C. or higher to be visually detected.

Application Example 105

A printing ink was prepared by uniformly dispersing 30 parts of the microcapsule pigment prepared in Example 103 (which had been cooled to −8° C. or lower to develop a pink color in advance) into an aqueous ink vehicle composed of 60 parts of an acrylic resin emulsion (solid content: 45%), 1 part of a viscosity regulator, 0.2 parts of an antifoaming agent, and 8.8 parts of water.

Using the thus obtained ink, a large number of star patterns were screen-printed on a white T-shirt (made of cotton) with a 100-mesh screen plate to obtain a thermochromic color-memory T-shirt On the surface of the T-shirt, a large number of pink star patterns were visually recognized at room temperature (25° C.), and the star patterns were not changed by the body temperature or ambient temperature; however, when the T-shirt was heated to 77° C. or higher, the star patterns turned colorless, and the pink star patterns were again visually recognized when the T-shirt was cooled to −8° C. or lower.

It was possible to arbitrarily change the design of the T-shirt by decoloring some of the star patterns on the surface of the T-shirt by heating the T-shirt with an iron or the like, to form a pattern in which arbitrarily selected star patterns alone were decolored, or to form a letter(s) or a pattern with the star shapes. Further, the T-shirt was able to retain such a discolored state in a room temperature range, and by heating the whole T-shirt to 77° C. or higher to decolor all of the star patterns and then cooling the T-shirt to −8° C. or lower, it was possible to allow the decolored star shapes to develop the color again.

Application Example 106

Using an extruder, 5 parts of the microcapsule pigment prepared in Example 106, 1 part of a dispersant, 0.1 parts of a non-thermochromic pink pigment, and 93.9 parts of a polypropylene homopolymer were melt-mixed at 180° C. to obtain a thermochromic pellet.

Using the thus obtained pellets, a plastic cup was molded by an injection molding machine at a cylinder temperature of 180° C.

This cup turned purple when cooled to −16° C. or lower, and still retained the purple color even when left to stand at room temperature (25° C.). However, when a beverage having a temperature of 58° C. or higher was poured into the cup, the portion of the cup containing the beverage turned pink. When the beverage was removed and the cup was cooled to −16° C. or lower, the portion of the cup which had turned pink turned back to purple again.

Application Example 107

A printing ink was prepared by uniformly dispersing 20 parts of the microcapsule pigment prepared in Example 104 (which had been cooled to −9° C. or lower to develop a black color in advance) into an aqueous ink vehicle composed of 78.0 parts of an acrylic resin emulsion (solid content: 40%) and 2.0 parts of an antifoaming agent.

Using the thus obtained printing ink, a forgery detection mark was gravure-printed on a gift certificate printed with a non-thermochromic ink on a high-quality paper. This forgery detection mark showed a black color at room temperature (25° C.) and its color was not changed by the body temperature or ambient temperature; however, the mark turned colorless when heated to 75° C. or higher, and the mark again showed a black color when cooled to −9° C. or lower.

Since this forgery detection mark of the gift certificate shows a black color and does not change its color in a room temperature range, it cannot be discriminated as a forgery detection mark however, the mark turns colorless when heated to 75° C. or higher and thus has a forgery-preventing function.

Next, an example including the ester compound represented by the formula (2) as the component (c) is shown.

Example 201

Preparation Process of Thermochromic Color-Memory Composition

A thermochromic color-memory composition was obtained by mixing three components composed of 1 part of 3-(2-ethoxy-4-diethylaminophenyl)-3-(1-ethyl-2-methylindol-3-yl)-4-azaphthalide as the component (a), 2 parts of 2,2-bis(4-hydroxyphenyl)hexafluoropropane as the component (b), and 50 parts of a diester (compound 221) of 4-phenylphenol ethylene glycol ether and cyclohexanecarboxylic acid and 1 part of stearyl laurate as the component (c), followed by heating to uniformly dissolve them.

The thermochromic color-memory composition changed color from blue to colorless.

Preparation of Measuring Sample

The thermochromic color-memory composition was charged into a transparent glass capillary having an inner diameter of 1 mm and a length of 78 mm to a height of about 10 mm from the bottom of the capillary, whereby a measuring sample was obtained.

Measurement of Discoloration Temperature

The whole part of the portion in which the thermochromic color-memory composition had been charged among the measuring sample was immersed in water. While the temperature of the water was changed, the discoloring state of the thermochromic color-memory composition was visually observed to measure $T_1$ (complete coloring temperature), $T_2$ (coloring starting temperature), $T_3$ (decoloring starting temperature), and $T_4$ (complete decoloring temperature), and $T_H$ [temperature at a midpoint between $T_1$ and $T_2$; $(T_1+T_2)/2$], $T_G$ [temperature at a midpoint between $T_3$ and $T_4$; $(T_3+T_4)/2$], and $\Delta H$ (hysteresis width; $T_G-T_H$) were determined.

The thermochromic color-memory composition of Example 201 showed hysteresis characteristics of $T_1$: 35° C., $T_2$: 41° C., $T_3$: 51° C., $T_4$: 59° C., $T_H$: 38° C., $T_G$: 55° C., and $\Delta H$: 17° C.

Example 202

A thermochromic color-memory composition was prepared in the same manner as in Example 201, except that the component (c) of Example 201 was changed to 50 parts of a diester (compound 224) of 4-phenylphenol diethylene glycol and lauric acid, A measuring sample was produced in the same manner as in Example 201 using the thermochromic color-memory composition of Example 202, and when the discoloration temperature was measured, the hysteresis characteristics of $T_1$: 34° C., $T_2$: 38° C., $T_3$: 51° C. $T_4$: 55° C., $T_H$: 36° C. $T_G$: 53° C., and $\Delta H$: 17° C. were shown.

Example 203

A thermochromic color-memory composition was prepared in the same manner as in Example 201, except that the component (c) of Example 201 was changed to 50 parts of a diester (compound 247) of 4-phenylphenol triethylene glycol and cyclohexanecarboxylic acid.

A measuring sample was produced in the same manner as in Example 201 using the thermochromic color-memory composition of Example 203, and when the discoloration temperature was measured, the hysteresis characteristics of $T_1$: 40° C., $T_2$: 44° C., $T_3$: 54° C., $T_4$: 62° C., $T_H$: 42° C., $T_G$: 58° C., and $\Delta H$: 16° C. were shown.

Example 204

Preparation Process of Microcapsule Pigment

Thermochromic color-memory composition composed of 1 part of 3-(2-ethoxy-4-diethylaminophenyl)-3-(1-ethyl-2-methylindol-3-yl)-4-azaphthalide as the component (a), 5 parts of 2,2-bis(4-hydroxyphenyl)hexafluoropropane as the component (b), and 50 parts of a diester (compound 203) of 4-phenylphenol ethylene glycol ether and octanoic acid as the component (c) was mixed and uniformly melted by heating. The resultant was further mixed with 20 parts of an aromatic polyvalent isocyanate prepolymer as a membrane wall material and 40 parts of ethyl acetate, and the resulting solution was added to 100 parts of a 15% aqueous gelatin solution and emulsion-dispersed to form microdroplets.

After continuously stirring the thus obtained dispersion at 70° C. for about 1 hour, an aqueous solution obtained by dissolving 2 parts of an aqueous amine compound (manufactured by Mitsubishi Chemical Corporation, trade name: jER CURE U; an amine adduct of epoxy resin) in 23 parts of water was slowly added thereto with stirring, and the resultant was further continuously stirred for about 3 hours with the temperature thereof being maintained at 90° C., thereby obtaining a microcapsule pigment suspension.

The microcapsule pigment was isolated from the microcapsule pigment suspension by centrifugal separation, thereby a microcapsule pigment changing color from blue to colorless was obtained (average particle diameter: 1.9 μm).

Preparation of Measuring Sample

An ink was prepared by uniformly dispersing 40 parts of the microcapsule pigment in an aqueous ink vehicle composed of 50 parts of an ethylene-vinyl acetate resin emulsion, 1 part of a leveling agent, 1 part of an antiforming agent, 0.5 parts of a viscosity regulator, and 7.5 parts of water. A measuring sample was obtained by screen-printing a solid pattern on a high-quality paper by using the ink.

Measurement of Hysteresis Characteristics

The measuring sample was placed in the measurement portion of the colorimeter (TC-3600 type colorimeter, manufactured by Tokyo Denshoku, Co. Ltd.), temperature of the sample portion was increasing or decreasing at a speed of 1.0° C./min to measure a brightness value as color density at each temperature, to thereby plot a color density-temperature curve. From the color density-temperature curve, $T_1$, $T_2$, $T_3$, $T_4$, $T_H$ [temperature at a midpoint between $T_1$ and $T_2$: $(T_1+T_2)/2$], $T_G$ [temperature at a midpoint between $T_3$ and $T_4$: $(T_3+T_4)/2$], and ΔH (hysteresis width: $T_G-T_H$) were determined.

The microcapsule pigment of Example 204 showed hysteresis characteristics of $T_1$: −11° C., $T_2$: −5° C., $T_3$: 54° C., $T_4$: 62° C., $T_H$: −8° C., $T_G$: 58° C., and ΔH: 66° C.

Examples 205 to 211

In the same manner as in Example 204 except that the component (a) and the component (c) of the thermochromic color-memory composition encapsulated in microcapsules and blending amounts thereof were changed to the compounds and the blending amounts as listed in Table 5 below, microcapsule pigments of Examples 205 to 211 were prepared and their hysteresis characteristics were measured in the same manner as in Example 204.

TABLE 5

| Example | Component (a) | Blending amount | Component (b) | Blending amount | Component (c) | Blending amount | Average particle diameter (μm) |
|---|---|---|---|---|---|---|---|
| 205 | P | 2 | 2,2-bis(4-hydroxyphenyl)hexafluoropropane | 5 | Diester of 4-phenylphenol ethylene glycol ether and octanoic acid (compound 203) | 50 | 1.8 |
| 205 | Q | 3 | 2,2-bis(4-hydroxyphenyl)hexafluoropropane | 5 | Diester of 4-phenylphenol ethylene glycol ether and octanoic acid (compound 203) | 50 | 2.0 |
| 207 | R | 1 | 2,2-bis(4-hydroxyphenyl)hexafluoropropane | 5 | Diester of 4-phenylphenol ethylene glycol ether and nonanoic acid (compound 208) | 50 | 2.2 |
| 208 | R | 1 | 2,2-bis(4-hydroxyphenyl)hexafluoropropane | 5 | Diester of 4-phenylphenol ethylene glycol ether and decanoic acid (compound 214) | 50 | 1.7 |
| 209 | R | 1 | 2,2-bis(5-hydroxyphenyl)hexafluoropropane | 5 | Diester of 4-phenylphenol diethylene glycol ether and lauric acid (compound 224) | 50 | 2.5 |
| 210 | P | 1 | 2,2-bis(6-hydroxyphenyl)hexafluoropropane | 5 | Diester of 4-phenylphenol triethylene glycol ether and lauric acid (compound 233) | 50 | 2.0 |
| 211 | R | 1 | 2,2-bis(7-hydroxyphenyl)hexafluoropropane | 5 | Diester of 4-phenylphenol triethylene glycol ether and myristic acid (compound 239) | 50 | 2.3 |

P of the component (a) in the table is 2-(2-chloroanilino)-6-di-n-butylaminofluoran Q is 1,2-benz-6-(N-ethyl-N-iso-amylamino)fluoran, and R is 3-(2-ethoxy-4-diethylaminophenyl)-3-(1-ethyl-2-methylindol-3-yl)-4-azaphthalide.

Further, in Table 1, the amounts are given in parts by mass.

Color changes and values of $T_1$, $T_2$, $T_3$, $T_4$, $T_H$, $T_G$, and $\Delta H$ of the microcapsule pigments of Examples 205 to 211 are shown in Table 2 below.

TABLE 6

| Example | Color change During color development ←→ during decoloration | Discoloration characteristic (° C.) | | | | | | |
|---|---|---|---|---|---|---|---|---|
| | | $T_1$ | $T_2$ | $T_3$ | $T_4$ | $T_H$ | $T_G$ | $\Delta H$ |
| 205 | Black ←→ colorless | −15 | −9 | 47 | 59 | −12 | 53 | 65 |
| 206 | Pink ←→ colorless | −12 | −6 | 47 | 59 | −9 | 53 | 62 |
| 207 | Blue ←→ colorless | −3 | 1 | 54 | 60 | −1 | 57 | 58 |
| 208 | Blue ←→ colorless | 5 | 11 | 62 | 70 | 8 | 66 | 58 |
| 209 | Blue ←→ colorless | 1 | 7 | 39 | 49 | 4 | 44 | 40 |
| 210 | Blue ←→ colorless | −33 | −17 | 41 | 53 | −25 | 47 | 72 |
| 211 | Blue ←→ colorless | −4 | 4 | 48 | 62 | 0 | 55 | 55 |

Application Example 201

An ink for a writing instrument was prepared by uniformly dispersing 27 parts of the microcapsule pigment prepared in Example 204 (which had been cooled to −11° C. or lower to develop a blue color in advance) in a vehicle composed of 0.3 parts of succinoglycan (shear-thinning agent), 3.0 parts of a sugar mixture [manufactured by Sanwa Starch Co., Ltd., trade name: SANDEC 70], 0.5 parts of a phosphate ester-based surfactant, 0.1 parts of an antifungal agent, 1.0 parts of triethanolamine and 68.1 parts of water.

Preparation of Writing Instrument

An ink-storing tube made of a polypropylene pipe was filled by suction with the ink and connected, via a holder made of a resin, with a ballpoint pen tip holding a 0.5 mm stainless steel ball on its front end.

Then, a viscoelastic ink follower (liquid plug) containing polybutene as a main component was filled from the rear end of the polypropylene pipe to obtain a ballpoint pen refill.

This ballpoint pen refill was incorporated into an axial barrel to obtain a writing instrument (retractable ballpoint pen).

This writing instrument had a structure in which the ballpoint pen refill was stored inside the axial barrel with a tip provided thereon being exposed to the outside air and the tip was projected from the front-end opening of the axial barrel by the action of a clip-shaped projection-retraction mechanism (sliding mechanism) arranged on the side of the axial barrel.

On the rear end of the axial barrel, a friction member made of an SEBS resin was arranged.

With the end of the ballpoint pen tip being projected from the frontend opening of the axial barrel by the action of the projection-retraction mechanism, a blue letter (handwriting) was formed by writing on a sheet of paper.

When this handwriting was rubbed with the SEBS resin-made friction member arranged on the rear end of the axial barrel, the letter was decolored to colorless, and this state could be maintained under room temperature.

Meanwhile, when the sheet of paper after the decoloration was cooled to a temperature of −11° C. or lower, the letter showed a discoloration behavior of turning blue again, and this behavior was repeatedly reproducible.

Application Example 202

An ink for a writing instrument was prepared by uniformly dispersing 27 parts of the microcapsule pigment prepared in Example 205 (which had been cooled to −15° C. or lower to develop a black color in advance) into an aqueous ink vehicle composed of 0.33 parts of xanthan gum (shear thinning agent), 10M parts of urea, 10 parts of glycerin, 0.6 parts of a nonionic surfactant, 0.1 parts of a modified silicone antifoaming agent, 0.2 parts of an antifungal agent, and 51.77 parts of water.

Preparation of Writing Instrument

A polypropylene pipe was filled by suction with the ink and connected, via a holder made of a resin, with a ballpoint pen tip holding a 0.5 mm stainless steel ball on its front end.

Next, an ink follower (liquid plug) containing polybutene as a main component and having viscoelasticity was filled from the rear end of the polypropylene pipe, and a tail plug was fitted in the rear portion of the pipe. A front axial barrel and a rear axial barrel were assembled, a cap was fitted thereto, and then degassing treatment was carried out by centrifugation, whereby a writing instrument (ballpoint pen) was obtained.

The rear portion of the rear axial barrel has a rubber made of SEBS attached as a frictional body.

Using the writing instrument, a black letter (handwriting) was formed by writing on a sheet of paper.

The handwriting showed black at room temperature (25° C.), but the letter discolored and became colorless when the letter was rubbed using the frictional body. This state could be maintained under room temperature.

Meanwhile, when the sheet of paper after the decoloration was placed into a freezer and cooled to a temperature of −15° C. or lower, the letter showed a discoloration behavior of turning black again, and this behavior was repeatedly reproducible.

Application Example 203

An ink for a writing instrument was prepared by mixing 25 parts of the microcapsule pigment prepared in Example 206 (which had been cooled to −12° C. or lower to develop a pink color in advance) with 0.5 parts of hydroxyethyl cellulose, 0.2 parts of a comb type polymer dispersant [manufactured by Lubrizol Japan Ltd., trade name: SOL-SPERSE 43000], 1.0 parts of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 25.0 parts of glycerin, 0.02 parts of an antifoaming agent, and 47.78 parts of water.

Preparation of Filled-In Type Writing Instrument

An ink absorbent prepared by covering a polyester sliver with a synthetic resin film was impregnated with the ink and inserted into an axial barrel made of a polypropylene resin. Then, the axial barrel was assembled with a resin-processed pen body (cannonball shape) made of polyester fibers via a holder in such a manner that the front end of the axial barrel was in connection with the pen body, and a cap was fitted thereto to obtain a writing instrument (marking pen).

The rear end portion of the axial barrel has an SEBS resin attached as a friction member.

Using the writing instrument, a pink letter (handwriting) was formed by writing on a sheet of paper.

The handwriting showed pink at room temperature (25° C.), but the letter discolored and became colorless when the letter was rubbed using the frictional body. This state could be maintained under room temperature, Meanwhile, when the sheet of paper after the decoloration was cooled to a temperature of −12° C. or lower, the letter showed a discoloration behavior of turning pink again, and this behavior was repeatedly reproducible.

Application Example 204

A paint was prepared by uniformly dispersing 2.5 parts of the microcapsule pigment prepared in Example 208 and 1.5 parts of a non-thermochromic fluorescent pink pigment in an oil-based ink vehicle composed of 12.5 parts of a vinyl chloride-vinyl acetate copolymer resin, 38.3 parts of xylene, 45 parts of butyl acetate, and 0.2 parts of a viscosity-adjusting agent.

After allowing the thus obtained paint to change its color to purple by cooling it to a temperature of 5° C. or lower, the paint was applied by spray-coating on a plug part (white) of a household electric cord to form a reversibly thermochromic layer, thereby obtaining a thermochromic color-memory plug.

The plug showed a purple color at room temperature (25° C.); however, when heated, it turned pink at a temperature of 70° C. or higher. When the plug was cooled from this discolored state, it again showed a purple color at a temperature of 5° C. or lower.

Once this thermochromic color-memory plug turns pink at a temperature of 70° C. or higher, it is capable of maintaining a discolored state in pink unless it is cooled to a temperature of 5° C. or lower. This enabled the temperature history when the plug was abnormally overheated and reached a high-temperature range of 70° C. or higher to be visually detected.

Application Example 205

A printing ink was prepared by uniformly dispersing 30 parts of the microcapsule pigment prepared in Example 206 (which had been cooled to −12° C. or lower to develop a pink color in advance) into an aqueous ink vehicle composed of 60 parts of an acrylic resin emulsion (solid content: 45%), 1 part of a viscosity regulator, 0.2 parts of an antifoaming agent, and 8.8 parts of water.

Using the thus obtained ink, a large number of heart patterns were screen printed on a white T-shirt (made of cotton) with a 100-mesh screen plate to obtain a thermochromic color-memory T-shirt.

On the surface of the T-shirt, a large number of pink heart patterns were visually recognized at room temperature (25° C.), and the heart patterns were not changed by the body temperature or ambient temperature; however, when the T-shirt was heated to 59° C. or higher, the heart patterns turned colorless, and the pink heart patterns were again visually recognized when the T-shirt was cooled to −12° C. or lower.

It was possible to arbitrarily change the design of the T-shirt by decoloring some of the heart patterns on the surface of the T-shirt by heating the T-shirt with an iron or the like, to form a pattern in which arbitrarily selected heart patterns alone were decolored, or to form a letter(s) or a pattern with the heart shapes. Further, the T-shirt was able to retain such a discolored state in a room temperature range, and by heating the whole T-shirt to 59° C. or higher to decolor all of the heart patterns and then cooling the T-shirt to −12° C. or lower, it was possible to allow the decolored heart shapes to develop the color again.

Application Example 206

Using an extruder, 5 parts of the microcapsule pigment prepared in Example 208, 1 part of a dispersant, 0.1 parts of a non-thermochromic pink pigment, and 93.9 parts of a polypropylene homopolymer were melt-mixed at 180° C. to obtain a thermochromic pellet.

Using the thus obtained pellets, a plastic cup was molded by an injection molding machine at a cylinder temperature of 180° C.

This cup turned purple when cooled to −5° C. or lower, and still retained the purple color even when left to stand at room temperature (25° C.). However, when a beverage having a temperature of 70° C. or higher was poured into the cup, the portion of the cup containing the beverage turned pink. When the beverage was removed and the cup was cooled to −5° C. or lower, the portion of the cup which had turned pink turned back to purple again.

Application Example 207

A printing ink was prepared by uniformly dispersing 20 parts of the microcapsule pigment prepared in Example 205 (which had been cooled to −15° C. or lower to develop a black color in advance) into an aqueous ink vehicle composed of 78.0 parts of an acrylic resin emulsion (solid content: 40%) and 2.0 parts of an antifoaming agent.

Using the thus obtained printing ink, a forgery detection mark was gravure-printed on a gift certificate printed with a non-thermochromic ink on a high-quality paper. This forgery detection mark showed a black color at room temperature (25° C.) and its color was not changed by the body temperature or ambient temperature; however, the mark turned colorless when heated to 59° C. or higher, and the mark again showed a black color when cooled to −15° C. or lower.

Since this forgery detection mark of the gift certificate shows a black color and does not change its color in a room temperature range, it cannot be discriminated as a forgery detection mark; however, the mark turns colorless when heated to 59° C. or higher and thus has a forgery-preventing function.

REFERENCE SIGNS LIST $T_1$ complete coloring temperature
$T_2$ coloring starting temperature T₃ decoloring starting temperature
T₄ complete decoloring temperature
ΔH hysteresis width

The invention claimed is:

1. A thermochromic color-memory microcapsule pigment encapsulating a thermochromic color-memory composition comprising:
   (a) an electron-donating color-developing organic compound;
   (b) an electron-accepting compound; and
   (c) an ester compound represented by the following formula (1) or (2), as a reaction medium which controls color reaction of the component (a) and the component (b):

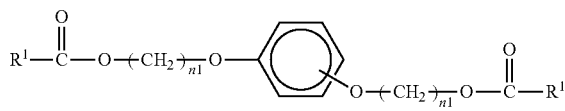
(1)

wherein each $R^1$ independently represents a cycloalkyl group having 3 to 8 carbon atoms or a cycloalkylalkyl group having 4 to 9 carbon atoms, and each n1 independently represents an integer of 1 to 3; and

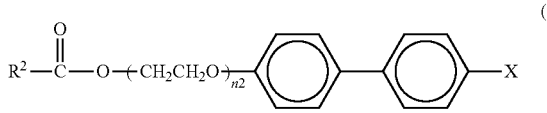
(2)

wherein $R^2$ represents an alkyl group having 3 to 17 carbon atoms, a cycloalkyl group having 3 to 8 carbon atoms, or a cycloalkylalkyl group having 5 to 8 carbon atoms, X represents a hydrogen atom, an alkyl group having 1 to 5 carbon atoms, a methoxy group, an ethoxy group, or a halogen atom, and n2 represents an integer of 1 to 3.

2. An ink composition comprising the thermochromic color-memory microcapsule pigment according to claim 1, and a vehicle.

3. The ink composition according to claim 2, comprising the thermochromic color-memory microcapsule pigment in an amount of 5 to 40% by mass with respect to the total mass of the ink composition.

4. A writing instrument comprising: an axial barrel which stores the ink composition according to claim 2; and a pen body which delivers the ink composition stored in the axial barrel.

5. The writing instrument according to claim 4, further comprising a friction member.

6. The thermochromic color-memory microcapsule pigment according to claim 1, wherein in the ester compound represented by the formula (1), each $R^1$ independently represents a cycloalkyl group having 5 to 7 carbon atoms or a cycloalkylalkyl group having 5 to 8 carbon atoms.

7. The thermochromic color-memory microcapsule pigment according to claim 1, wherein in the ester compound represented by the formula (1), each $R^1$ independently represents a cyclohexyl group or a cycloalkylalkyl group having 7 or 8 carbon atoms.

8. The thermochromic color-memory microcapsule pigment according to claim 1, wherein in the ester compound represented by the formula (2), $R^2$ represents a linear alkyl group having 5 to 15 carbon atoms, a cycloalkyl group having 5 to 7 carbon atoms, or a cycloalkylalkyl group having 6 to 8 carbon atoms.

9. The thermochromic color-memory microcapsule pigment according to claim 1, wherein in the ester compound represented by the formula (2), $R^2$ represents a linear alkyl group having 7 to 13 carbon atoms, a cyclohexyl group, or a cycloalkylalkyl group having 7 or 8 carbon atoms.

10. The thermochromic color-memory microcapsule pigment according to claim 1, wherein the component (a) is a compound selected from the group consisting of a phthalide compound, a fluoran compound, a styrylquinoline compound, a diazarhodamine lactone compound, a pyridine compound, a quinazoline compound, and a bisquinazoline compound.

11. The thermochromic color-memory microcapsule pigment according to claim 1, wherein a composition ratios of the component (b) and the component (c) with respect to 1 part of the component (a) are 0.1 to 50 parts and 1 to 800 parts, respectively, on mass basis.

12. The thermochromic color-memory microcapsule pigment according to claim 1, having a hysteresis width ΔH of 8° C. to 80° C.

* * * * *